(12) United States Patent
Amano et al.

(10) Patent No.: US 7,512,667 B2
(45) Date of Patent: Mar. 31, 2009

(54) CONTROL SYSTEM

(75) Inventors: Miki Amano, Osaka (JP); Suguru Toyokawa, Kanagawa (JP); Takashi Murai, Kanagawa (JP); Manabu Kusaka, Tokyo (JP); Masahiro Ohara, Chiba (JP); Reiko Aoyama, Tokyo (JP)

(73) Assignee: Sharp Kabushuki Kaisha, Osaka (JP)

( * ) Notice: Subject to any disclaimer, the term of this patent is extended or adjusted under 35 U.S.C. 154(b) by 868 days.

(21) Appl. No.: 10/466,865

(22) PCT Filed: Jan. 11, 2002

(86) PCT No.: PCT/JP02/00157
§ 371 (c)(1),
(2), (4) Date: Nov. 13, 2003

(87) PCT Pub. No.: WO02/056633

PCT Pub. Date: Jul. 18, 2002

(65) Prior Publication Data
US 2004/0064551 A1    Apr. 1, 2004

(30) Foreign Application Priority Data
Jan. 15, 2001    (JP) .............................. 2001-006561

(51) Int. Cl.
*G06F 15/16* (2006.01)
(52) U.S. Cl. ...................... 709/217; 709/203; 709/218; 709/219; 370/338; 370/401
(58) Field of Classification Search ................. 709/203, 709/217, 218, 219; 370/338, 401
See application file for complete search history.

(56) References Cited

U.S. PATENT DOCUMENTS 6,038,486 A    3/2000    Saitoh et al.

(Continued)

FOREIGN PATENT DOCUMENTS

JP    07-044290    2/1995

(Continued)

OTHER PUBLICATIONS

Munson et al., "Flexible Internetworking of Devices and Controls," Industrial Electronics Society 1999, IECON '99 Proceedings, vol. 3, Nov. 29, 1999.

(Continued)

*Primary Examiner*—Jinsong Hu
(74) *Attorney, Agent, or Firm*—David G. Conlin; Steven M. Jensen; Edwards Angell Palmer & Dodge LLP

(57) ABSTRACT

A control system includes a first network including a controller 1, a second network including one or more controlled devices 3 to 6, and a translator 2 correlated with the first network and with the second network. The controlled device 3 comprises a controlled device information management unit 23 which manages controlled device information related to the controlled device 3; and a controlled device information communication unit 24 which sends controlled device information with appropriate timing. The translator 3 comprises a controlled device information proxy creating means which creates controlled device information proxies 35 based on controlled device information acquired from controlled devices 3; and an information managing means for registering and managing controlled device information and controlled device information proxies 35. The controller 1 comprises a means which acquires controlled device information proxies 35 from the translator 2 and issues operating instructions for operating the controlled devices 3 to 6. With this control system, an operator at a remote operation center can easily and remotely control equipment belonging to a network different from a network to which the remote operation center belongs.

13 Claims, 15 Drawing Sheets

U.S. PATENT DOCUMENTS

| | | | |
|---|---|---|---|
| 2001/0047394 A1* | 11/2001 | Kloba et al. | 709/217 |
| 2002/0073244 A1* | 6/2002 | Davies et al. | 709/328 |
| 2003/0196118 A1* | 10/2003 | Ushiki et al. | 713/201 |
| 2004/0081178 A1* | 4/2004 | Fujimori | 370/401 |
| 2004/0218575 A1* | 11/2004 | Ibe et al. | 370/338 |

FOREIGN PATENT DOCUMENTS

| | | |
|---|---|---|
| JP | 10-240337 | 9/1998 |
| JP | 11-234335 | 8/1999 |
| JP | 2000-115393 | 4/2000 |
| JP | 2000-132473 | 5/2000 |
| JP | 2000-207318 | 7/2000 |
| JP | 2000-236348 | 8/2000 |

OTHER PUBLICATIONS

Edwards, "The Five Key Concepts of Jini," Core Jini, Prentice Hall Ptr., Jun. 1999.

"Jini Architectural Overview," Sun Microsystems ICG White Paper, Jan. 1999.

* cited by examiner

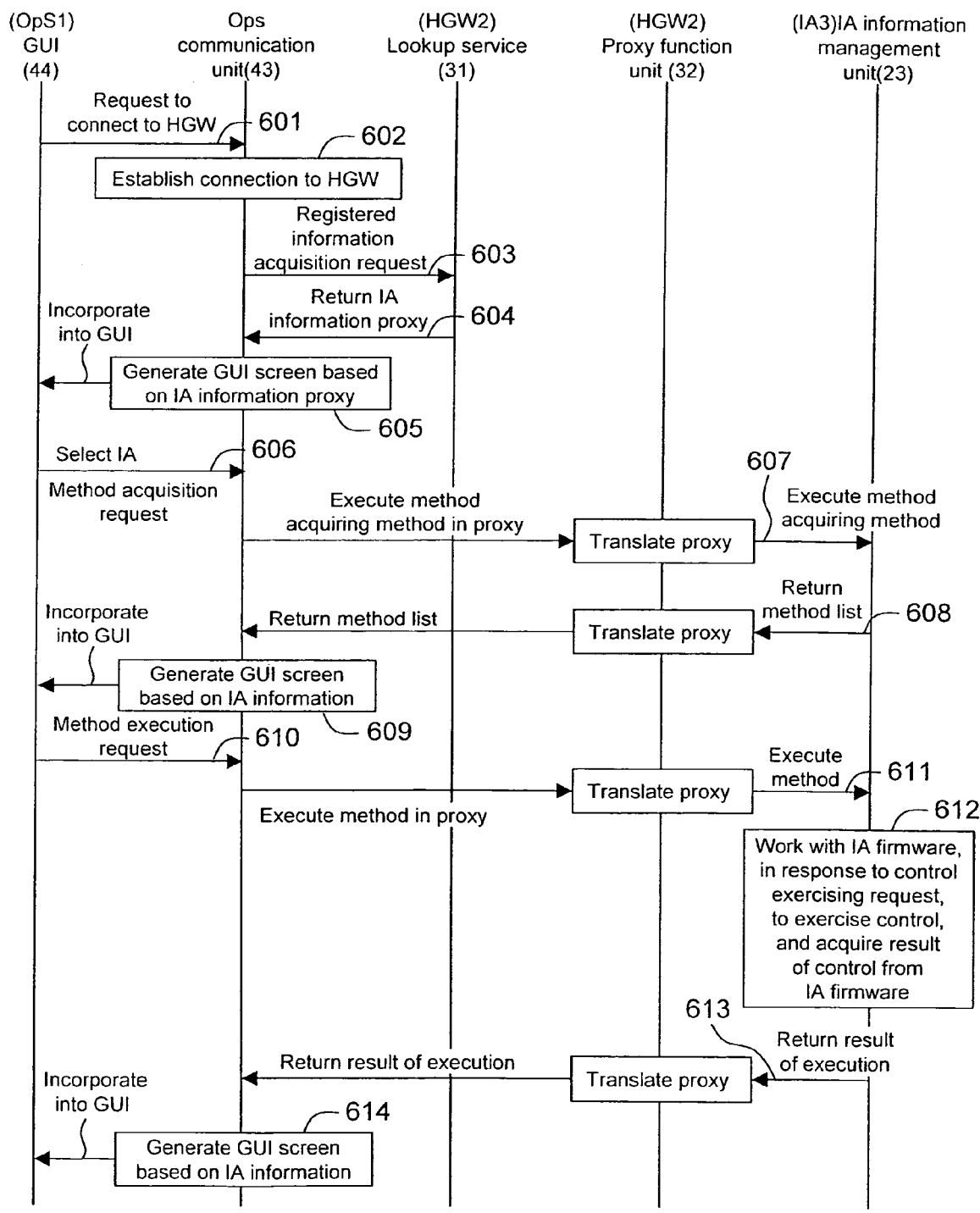

OpS communication unit 43
- 121 Framework analysis unit
- 122 Proxy execution unit

```
ACCESS  TARGET_IA
START  time_counter
SET  R_TEMP=-3°C
CHECK  R_CURRENT_TEMP
while(R_CURRENT_TEMP>-3°C){
   WAIT 3min
     CHECK  R_CURRENT_TEMP
}
STOP  time_counter
ECHO  time_counter
END.
```

CONTROL SYSTEM

TECHNICAL FIELD

The present invention relates to a control system for controlling, for example, controlled devices remotely located. This application is based on the Japanese Patent Application 2001-6561, all the contents of which are incorporated in this application by reference.

BACKGROUND ART

In case equipment fails, the measure most widely taken is methods dependent mainly on manual intervention. The user calls a support center and describes the phenomena of the failure. Then, the user remedies it by himself/herself or request to dispatch service personnel depending on the severity of it. Meanwhile, for communication devices, remote control systems have been established wherein devices are remotely maintained and controlled. In such a system, the status of devices is remotely monitored and the setting thereof is remotely changed.

For example, a system disclosed in the official gazette JP-A No. 115393/2000 has been proposed. In the system, recovery from failure and the mitigation of phenomena are effected by transmission from a control center. The control center transmits recovery data or programs according to error information notified by machines. Further, failures are prevented from occurring. This is done by predicting the occurrence of error based on error history information collected at the control center and transmitting a remedying program.

FIG. 19 illustrates the configuration of such a system. A control center 167 and access points (hereafter, referred to as "APs") 164 to 166 located in various places are connected with each other through a communication network 1611. Machine A 161, machine B 162 and machine C 163 as controlled devices are connected with AP 164. The control center 167 is connected with the machines 161 to 163 as controlled devices through respective APs 164 to 166. The control center 167 sends operation table data and programs for the machines 161 to 163, stored in a database (DB) 168, to the machines 161 to 163 and thereby maintains and controls the machines. If necessary, further, information is received from a remedying body 1610 or service personnel is dispatched from a service center 169 to cope with failures.

If a control center and a controlled device belong to different networks (for example, the device belongs to a private network and the control center belongs to a global network), direct accessing from one to the other is infeasible. In this case, a relaying function of some kind is required. Description will be given taking as an example the IPv4 (Internet Protocol Version 4) system which is presently a mainstream network protocol. In this system, local networks (Local Area Networks: hereafter, referred to as "LANs") are set up in homes and companies because of insufficiency of number of addresses. Here, to access a global network from LAN, an address translation technique, such as NAT (Network Address Translator) is used. The NAT translates private addresses contained in headers into global addresses but does not translate private addresses contained in data. Therefore, if a control center attempts to make an access using a private address contained in data, relaying operation cannot made by the NAT.

There are some methods for solving this problem. One of the methods is that a relaying device is placed between the control center and the controlled device and the relaying device is caused to manage controlled device addresses and a list of commands as tables. The control center sends a command to the relaying device. The relaying device interprets the received command and, referencing the command table, sends the command to the appropriate controlled device.

In this case, it is required to hold the command table at the relaying device. Therefore, if a new controlled device is added and commands are altered, the tables must be updated and this makes operation complicated.

Further, the relaying device must accept every command once and interpret it. Therefore, if a number of controlled devices or commands is increased, the amount of data in the command table becomes vast. This poses a problem of increase in the size of the relaying device.

The official gazette JP-A No. 115393/2000 states that the control center 167 or the machines 161 to 163 do not communicate directly with each other and other equipment may mediate between them for relay. However, the gazette does not refer to relaying methods and a problem associated with cases where control data contains a device address remains unsolved.

Even in an environment wherein remote control can be exercised from a control center, conventionally, only predetermined operation can be performed on predetermined devices. Further, operating procedures for remote control and data required for control vary from one manufacturer to another and from one device to another. This imposes an enormous burden both on operators who perform remote control and on controlled devices. On this account, it is difficult to systematically manage and control networks wherein devices of different manufacturers or different types coreside.

Further, it is required to keep information, required for controlling devices, at a control center. Therefore, each time an upgrade is provided or a device to be controlled is added, control information must be added or updated. This forces a large amount of labor to be expended in database management. Each error is different from another and measures against error may be different on an error-by-error basis. In this case, storing the know-how to remedy each of them poses a problem that immense maintenance cost is required.

Further, the official gazette JP-A No. 115393/2000 assumes that remedying programs against errors which may occur in devices can be identified to some extent. The gazette does not mention that the cause of an error is pinpointed through operation from a control center.

The present invention is intended, for example, to make it possible for an operator at an operation center remotely located to remotely control devices belonging to different networks with ease.

DISCLOSURE OF THE INVENTION

According to a first aspect of the present invention, a control system is provided. This control system includes a first network including a controller; a second network including one or more controlled devices; and a translator which is correlated with the first network and with the second network. The controlled device comprises a controlled device information management unit which manages controlled device information associated with the controlled devices; and a controlled device information communication unit which transmits the controlled device information with appropriate timing. The translator comprises a controlled device information proxy creating means which creates controlled device information proxies based on the controlled device information acquired from the controlled device; and an information managing means which registers and manages the controlled device information and the controlled device information proxies. The controller comprises a means which acquires the controlled device information proxies from the translator and issues operating instructions to operate the controlled devices.

In the control system, the controlled devices belonging to the second network can be controlled from the controller belonging to the first network. Thus, the management of information required for control can be simplified.

BRIEF DESCRIPTION OF DRAWINGS

FIG. 8 is a drawing illustrating a sequence in which a controlled device is controlled from the controller in the control system in the embodiment of the present invention;

BEST MODE FOR CARRYING OUT THE INVENTION

Figure 1:
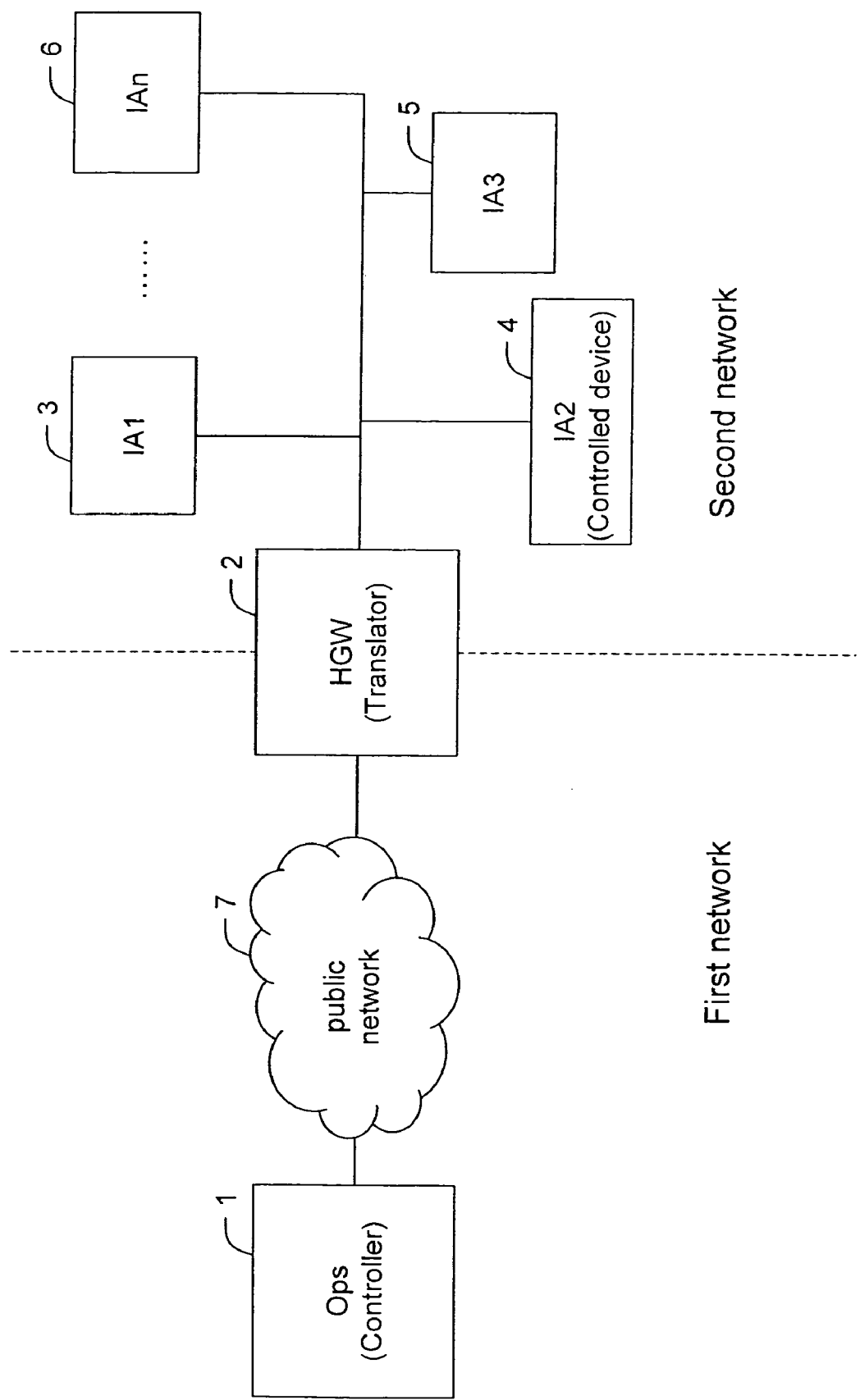
FIG. 1 is a drawing illustrating the configuration of the entire control system in an embodiment of the present invention.

Referring to the drawings, the embodiment of the present invention will be described below. The following embodiment does not limit the present invention.

FIG. 1 is a drawing illustrating the configuration of the control system (remote control system) in an embodiment of the present invention. In this specification, "controller" refers to a group of devices, such as an operation terminal and a database for customer information, for example, in an operation center remotely located. This controller will be described as controller OpS below. "Translator" refers to what functions as a gateway placed between, for example, different networks. This translator will be described as translator HGW below. "Controlled device" refers to a variety of types of equipment provided with a communicating function which equipment is to be remotely operated and is not only controlled but also carries out functions by itself. This controlled equipment will be described as controlled device IA below.

A first network is so constituted that the controller OpS is included therein, and a second network is so constituted that one or more controlled devices IA are included therein. The translator HGW is installed so that the translator HGW is correlated both with the first network and with the second network.

As illustrated in FIG. 1, the first network is constituted so that the controller OpS 1 and the public network 7 are included therein. The second network is constituted so that a plurality of the controlled devices IA3, IA4, IA5, and IA6 are included therein. The first network and the second network are connected with each other at the translator HGW 2 as a relay point. The controller OpS 1 and the translator HGW 2 are connected with each other through the public network 7.

The first network is, for example, a global network, and the second network is, for example, a home LAN. For example, the controller OpS 1 is correlated with the Internet, and the translator HGW is correlated both with the home LAN and with the Internet. The home LAN is correlated with the controlled devices IA of various manufacturers, models, and versions. "Correlated" includes a state in which a thing concerned is directly or indirectly connected, regardless of the way it is connected, wired or wireless.

The controller OpS is operated in various ways. For example, a manufacturer of controlled devices IA operates a controller OpS dedicated to its own controlled devices IA. Or, a service provider supporting a plurality of manufacturers operates controllers in a lump. Or, a manufacturer operates a control data DB, and a service provider utilizes the control data DB operated by the manufacturer. Further, a plurality of controllers OpS may exist on the Internet.

In this specification, controlled information the controlled device IA holds is described as controlled device information, and controlled information proxies the translator HGW holds are described as controlled device information proxies. Control information related to controlled devices (controlled device information) contains operating instructions executable in the second network (network including the controlled devices). Controlled device information proxies are information containing operating instructions executable in the first network.

Figure 2:
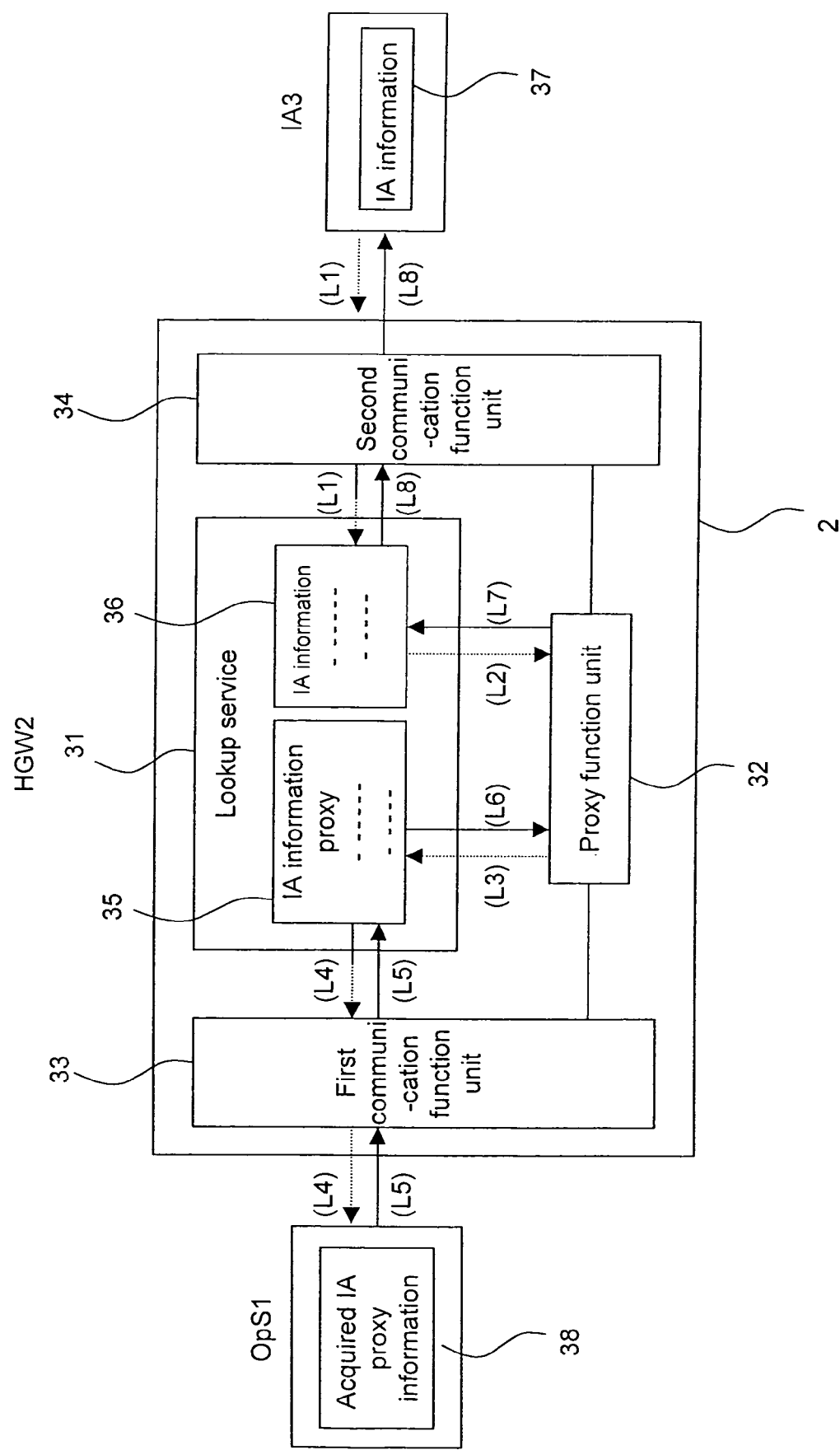
FIG. 2 is a drawing illustrating the constitution of the translator in the control system in the embodiment of the present invention.

FIG. 2 is a drawing illustrating an example of the constitution of the translator HGW 2. Since the translator HGW 2 is positioned between the first network and the second network, the translator HGW 2 has both a global address and a private address.

In the translator HGW 2, an information managing function works for registering and managing varied information. For example, when an inquiry is made to an information managing function, such as Lookup service, provided by middleware Jini, registered information can be acquired. The information managing function will be described as Lookup service 31 below. In the Lookup service 31, information including controlled device information proxies 35 and controlled device information 36 is registered.

The proxy function unit 32 is provided with a function of creating, from controlled device information 36, controlled device information proxies 35 corresponding thereto and registering them in the Lookup service 31. The proxy function unit 32 is also provided with a function of interfacing between controlled device information proxies 35 and controlled device information 36.

Figure 3:
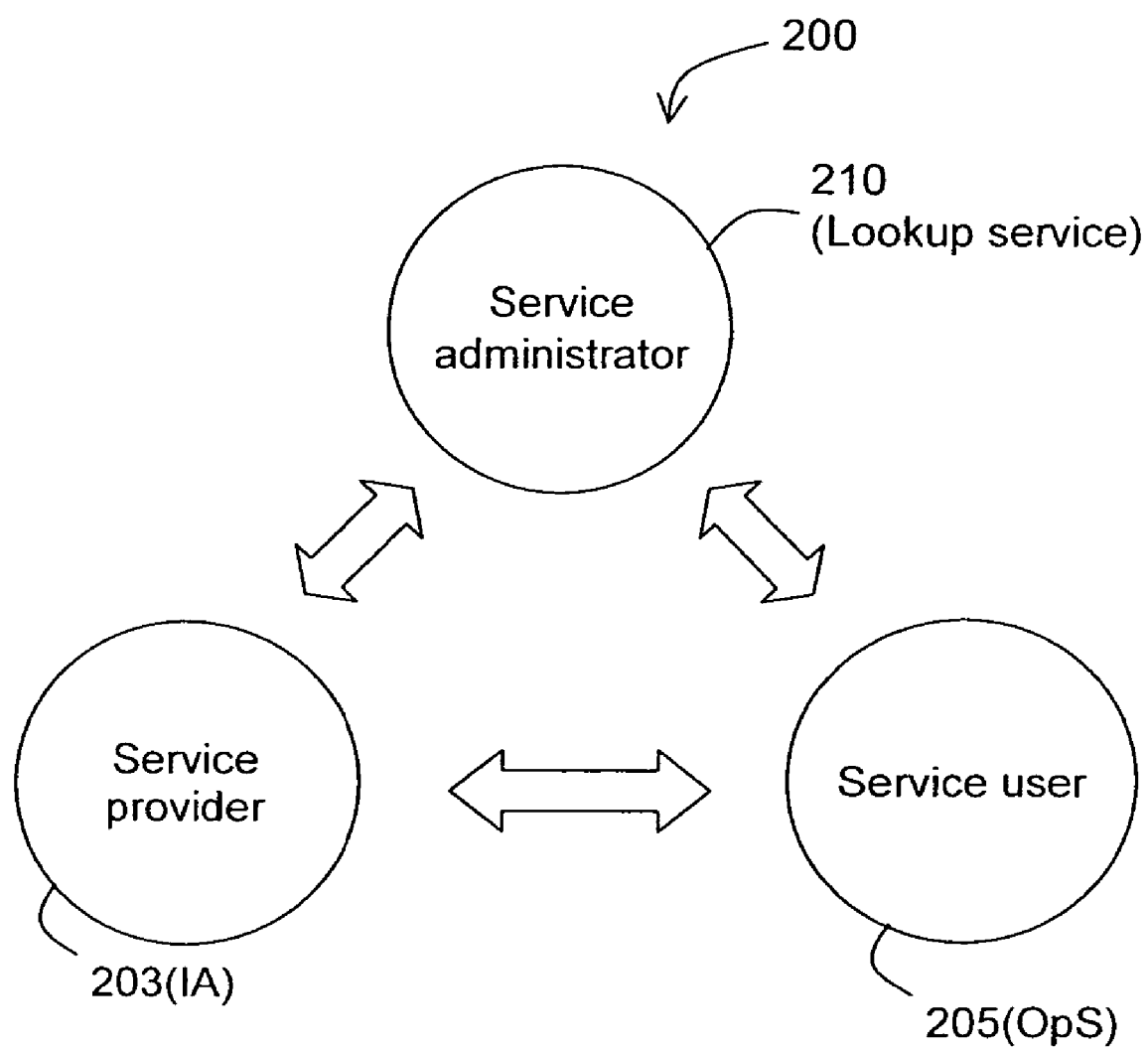
FIG. 3 is a drawing illustrating the constitution of a Lookup service system.

Referring to FIG. 3 and FIG. 4, the mechanism of the Lookup service will be described here. FIG. 3 is a drawing illustrating the basic system configuration of the Lookup service. FIG. 4 is drawings illustrating the basic processing procedures in the Lookup service.

As illustrated in FIG. 3, the Lookup service system 200 comprises a service administrator (Lookup service) 201, a service provider (IA) 203, and a service user (OpS) 205.

The service administrator 201 administers the services of the service provider 203 and provides the service user 205 with management information. The service provider 203 registers provided service information in the service administrator 201 and provides the service user 205 with services. The service user 205 searches the service administrator 201 for the service provider 203 and is serviced by the service provider 203.

In the example illustrated in FIG. 2, the service administrator 201 corresponds to the Lookup service, the service provider 203 to the controlled device IA, and the service user 205 to the controller OpS.

Figure 4A:
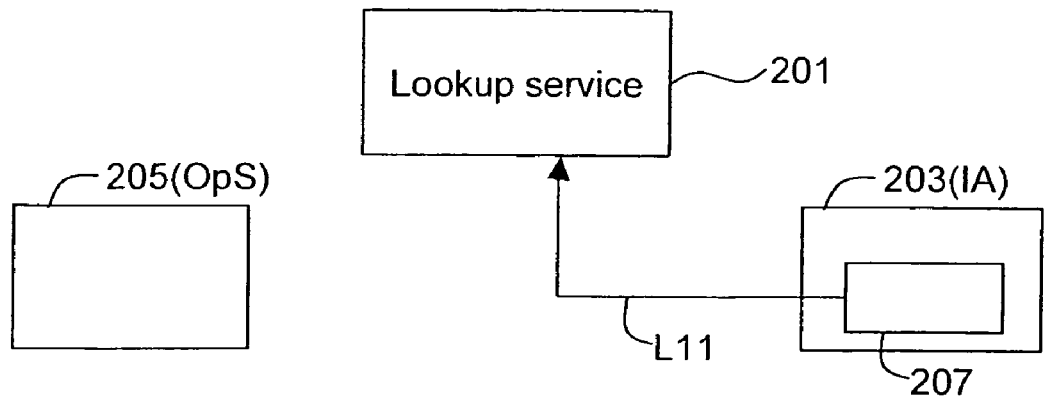
FIGS. 4(A) to 4(C) are drawings illustrating the basic principle of the Lookup service system.
Figure 4B:
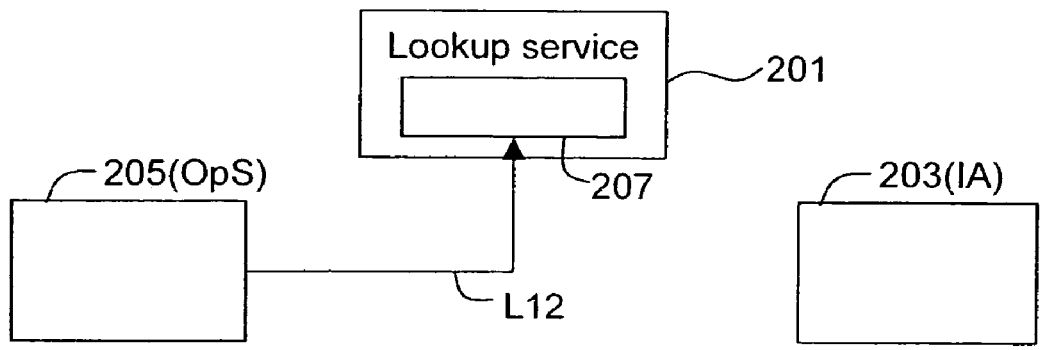
Figure 4C:
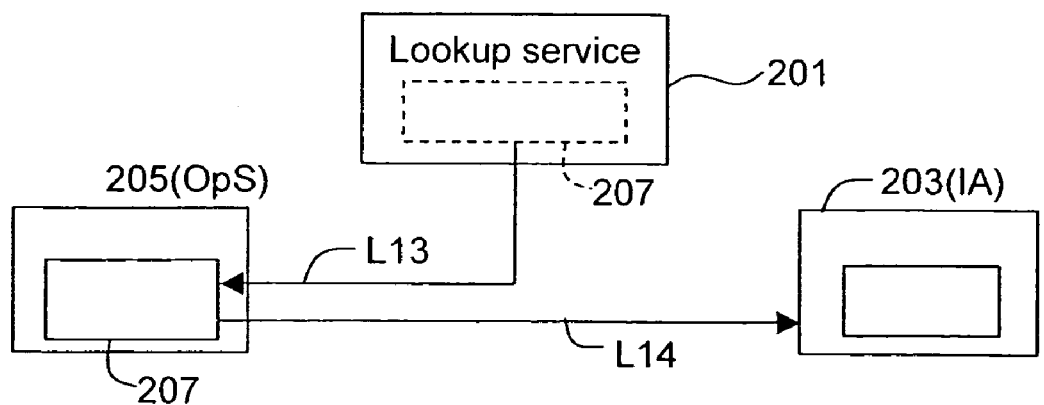

FIGS. 4(A) to 4(C) are drawings illustrating the basic procedures for using the Lookup service. When a new device is connected to the network (a service is added), the action illustrated in FIG. 4(A) is taken. That is, the controlled device IA as service provider 203 broadcasts its presence over the network. A service 207 stored in the controlled device IA is registered in the Lookup service as service administrator 201. The service 207 which can be provided is read into the Lookup service.

To use the service 207 registered in the service administrator (Lookup service) 201, the action illustrated in FIG. 4(B) is taken. That is, the service user (controller OpS) 205 requests the Lookup service as service administrator 201 to provide the service 207 (L12).

As illustrated in FIG. 4(C), the service administrator (Lookup service) 201 transfers a copy of the requested service 207 to the service user (controller OpS) 205 as client (L13). Using the copy of the service 207, the service user (controller OpS) 205 as client communicates with the controlled device IA as service provider 203 of the service concerned.

As an example, it is assumed that image data in a personal computer (PC) is to be printed on a printer through the Lookup service.

First, the printer registers a printing service in the Lookup service in advance. To print an image from the PC, the "printing service" is requested of the Lookup service. Information required for using the "printing service" is sent to the PC. The "printing service" is executed at the PC. The "printing service" in the PC passes the image data to the printer, and the printer starts printing. Thus, the printing job is performed.

The above-mentioned Lookup service is utilized in the control system in this embodiment.

The translator HGW 2 has a first communication function unit 33 which communicates with the first network (OpS) and a second communication function unit 34 which communicates with the second network (IA). The Lookup service 31 and the proxy function unit 32 are both connected with the first communication function unit 33 and with the second communication function unit 34. Therefore, the translator HGW 2 can communicate with the controller OpS 1 existing in the first network and with the controlled devices IA (3 to 6) existing in the second network.

Figure 5:
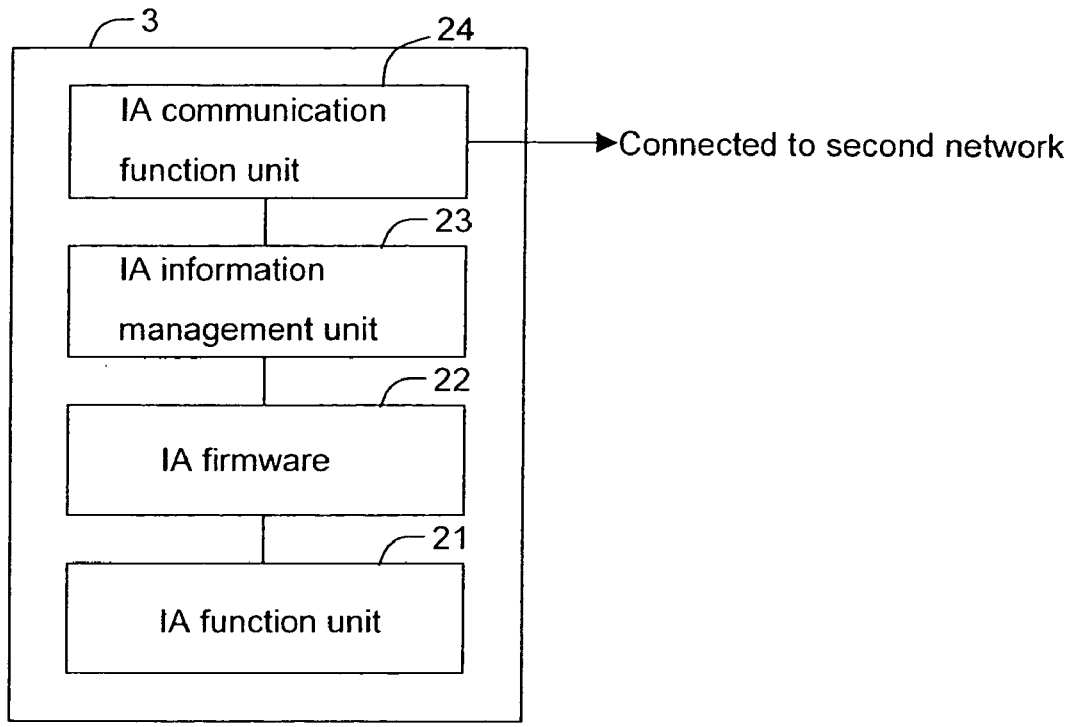
FIG. 5 is a drawing illustrating the constitution of the controlled device in the control system in the embodiment of the present invention.

FIG. 5 is a drawing illustrating an example of the constitution of the controlled device IA. Hereafter, representative of the controlled devices IA, only the controlled device IA3 is shown for convenience. The existing n controlled devices IA are basically constituted as illustrated in FIG. 5. Therefore, the description as "controlled device IA3" found below refers to the controlled device IA3 to the controlled device IA6.

The controlled device IA3 comprises a controlled device (IA) function unit 21 having functions specific to common controlled devices IA; controlled device (IA) firmware 22 which controls the controlled device (IA) function unit 21; a controlled device information management unit 23; and a controlled device (IA) communication function unit 24. The controlled device information management unit 23 has a managing function for controlled device information held by the controlled device IA3. Also, the controlled device information management unit 23 has a function of registering controlled device information in the information managing function working on the translator HGW 2.

The controlled device information held by the controlled device IA is information including second network address information held by the controlled device IA itself; controlled device (IA) operation methods for operating the controlled device IA; controlled device (IA) operation method information for utilizing the controlled device (IA) operation methods; and the property information of the controlled device IA. The controlled device information management unit 23 is also provided with a function of communicating controlled device IA operation methods contained in controlled device information to the controlled device (IA) firmware 22 and controlling the controlled device IA. The controlled device (IA) communication function unit 24 has a function of communication between the controlled device IA3 and the translator HGW 2 and of communicating with other controlled devices IA4 to IA6.

Figure 6:
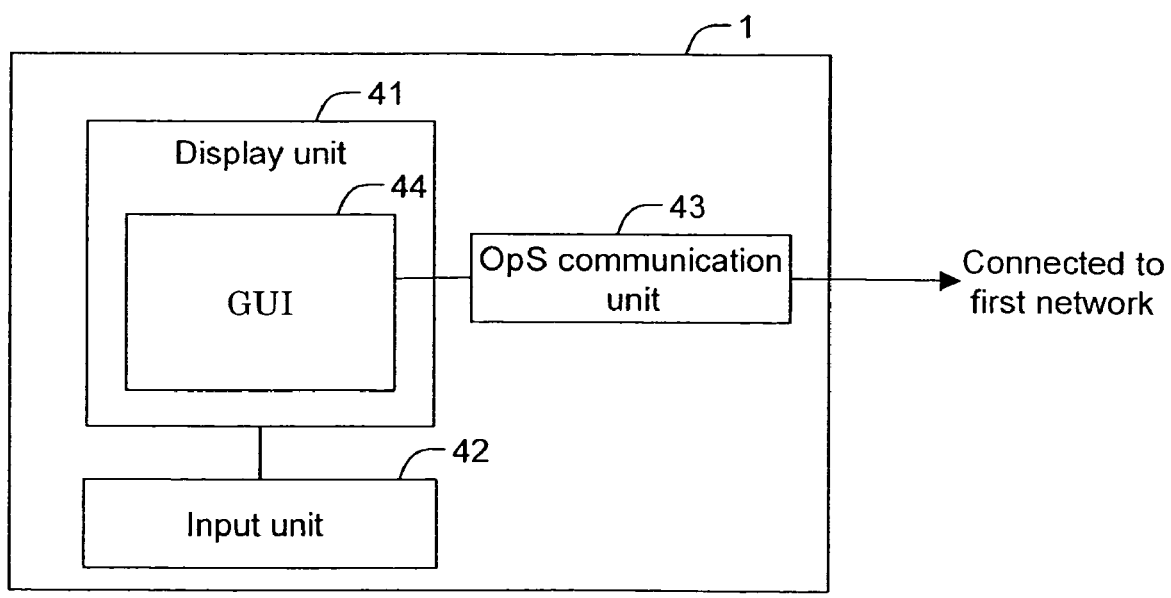
FIG. 6 is a drawing illustrating the constitution of the controller in the control system in the embodiment of the present invention.

FIG. 6 is a drawing illustrating an example of the constitution of the controller OpS 1. The controller OpS 1 is capable of controlling the controlled device IA3 through the translator HGW 2.

The controller OpS 1 comprises a display unit 41 which displays varied information; an input unit 42 for inputting control instructions to be issued from the controller OpS 1; and a controller (OpS) communication unit 43 which conducts communication. The display unit 41 is provided with GUI (Graphical User Interface) 44 for a controller (OpS) operator to operate. The operator of the controller OpS can use the GUI 44 to perform various operations. The controller (OpS) communication unit 43 does not only implement the communicating function. The communication unit 43 also enables the following: inquiring of the Lookup service 31 of the translator HGW 2 (FIG. 2) in response to a request from the GUI 44, and acquiring controlled device information proxies registered in the Lookup service 31.

Further, the controller (OpS) communication unit 43 is capable of issuing a method executive instruction based on the method information contained in the controlled device (IA) information proxies in response to a request from the GUI 44.

In this embodiment, the controller OpS 1 is equipped with the display unit 41. However, the controller OpS 1 may be provided with other equipment than the display unit 41, for example, a voice input/output unit.

Next, the flow of the registration of controlled device (IA) information and the flow of relaying of operation methods will be described.

First, referring to FIG. 2, the flow of the registration of controlled device information will be described. The flow of the registration of controlled device information is indicated by dotted lines, and the flow of relaying of operation methods is indicated by solid lines. The controlled device IA3 registers controlled device (IA) information 37, held by the controlled device IA3 itself, in the Lookup service 31 (L1). The controlled device (IA) information 36 registered in the Lookup service 31 contains operation methods required for remote control, information (e.g. private address) for identifying the controlled device (IA) in the second network, and the like.

Here, it is assumed that the controlled device IA3 is controlled form the controller OpS 1. In this case, the controller OpS 1 acquires controlled device (IA) information 36 from the Lookup service 31 and attempts to communicate with the controlled device IA3 at its private address. However, any control instruction will not reach the controlled device IA3. This is because the controller OpS 1 belongs to the first network and the controlled device IA3 belongs to the second network.

To cope with this, the following action is taken: when the proxy function unit 32 of the translator HGW 2 receives a controlled device information registration detection signal from the Lookup service 31 (L2), the proxy function unit 32 creates a corresponding controlled device (IA) information proxy 35. Then, the proxy function unit 32 registers the controlled device (IA) information proxy 35 in the Lookup service 31 (L3). The controlled device information (IA) proxy 35 contains, for example, the following information: information for identifying the controlled device IA3 in the second network, corresponding to the controlled device information 36; information required for relaying operation methods contained in the controlled device information 36; and information for identifying the translator HGW 2 in the first network (global address).

Next, the flow of relaying operation methods from the controller OpS 1 will be described. For the controller OpS 1 to control the controlled device IA3, the controller OpS 1 acquires the controlled device (IA) information proxy 35 from the Lookup service 31 of the translator HGW 2 first (L4) Using the acquired controlled device (IA) proxy information 38, the controller OpS 1 issues a controlled device (IA) operation method relaying instruction to the translator HGW 2 (L5).

The controlled device (IA) information proxy 35 for which the controlled device (IA) operation method relaying instruction was issued is sent to the proxy function unit 32 (L6). Based on the information contained in the controlled device (IA) information proxy 35, the proxy function unit 32 looks up corresponding controlled device (IA) information and an operation method to be executed. Then, the operation method in the controlled device (IA) information 36 looked up is executed and the operation method is sent to the controlled device IA3 (L7 and L8).

Following the above-mentioned procedure, the translator HGW 2 is capable of relaying operation methods from the controller OpS 1 to the controlled device IA3. The controlled device (IA) information proxy 35 itself contains corresponding controlled device information 36 and information about which operation method to be executed. Therefore, in the translator HGW 2, correspondence between the controlled device (IA) information 36 and the controlled device (IA) information proxies 35 need not be managed by tables or the like. When a controlled device (IA) information proxy 35 is executed from the controller OpS 1, the operation method in which controlled device (IA) information 36 should be executed can be known only by examining the controlled device (IA) information proxy 35 itself.

If the number of controlled devices IA3 or the amount of controlled device (IA) information 36 held by controlled devices IA3 is increased, that is, if the amount of controlled device (IA) 36 registered in the Lookup service 31 is increased, the number of controlled device (IA) information proxies 35 registered in the Lookup service 31 is increased. This is because the controlled device (IA) information 36 and the controlled device (IA) information proxies 35 correspond to each other. Even in this case, however, time and manpower required for the management of the correspondence will not be increased. This is because corresponding information is held by the controlled device (IA) information proxies 35 themselves.

Further, the controlled device information (IA) proxies 35 are automatically created and have a function of carrying out the relaying function of the translator HGW 2. Therefore, interfacing between the controlled device IA3 and the controller OpS is automatically implemented without need for manual intervention.

Next, referring to FIG. 2, the sequence in which controlled device (IA) information is registered in the control system in this embodiment will be described.

The controlled device IA3 registers controlled device (IA) information held by the controlled device IA3 itself in the Lookup service 31 with arbitrary timing (51). The controlled device IA3 can be designed so that controlled device (IA) information is automatically registered at the time when a specified event, such as connection to the network and application of power to the controlled device IA3, is started. Thus, controlled device information can be automatically registered in the Lookup service 31, and can be registered in the system without troubling the user.

In the Lookup service 31, when a controlled device (IA) information registration request (51) is received, the controlled device (IA) information is registered (52). Then, a controlled device (IA) information registration detection signal is put out to the proxy function unit 32 (53). Receiving the registration detection signal (53), the proxy function unit creates a controlled device (IA) information proxy 35 corresponding to the controlled device information 36 (55). This proxy 35 contains such information as identification information for the first network (e.g. global address) correlated with the translator HGW 2, relayed information about which operation method of which controlled device (IA) information 36 (e.g. private address) should be executed, and the like. Further, the created controlled device (IA) information proxy 35 is registered in the Lookup service 31 (56).

By following the above-mentioned sequence, information required for controlling controlled devices IA can be provided to the controller OpS 1. After a controlled device IA completes the above sequence of controlled device (IA) information registration, the controlled device IA can be controlled from the controller OpS 1.

When a new controlled device IA is connected to the second network, the newly connected controlled device IA and the translator HGW 2 repeat the procedure steps 51 to 56 mentioned above to register the controlled device (IA) information.

Next, referring to FIG. 8, the sequence of operation from the controller OpS 1 in the control system in this embodiment will be described. Controlled devices IA which can be controlled from the controller OpS 1 are those for which the sequence of controlled device information registration, illustrated in FIG. 2, has been completed.

First, at the controller OpS 1, the operator of the controller OpS 1 uses the GUI 44 to deliver a request to the controller OpS communication unit 43. This request is to ask to connect to the translator HGW 2 correlated with the network to which the controlled device IA3 belongs (601). At this time, the trigger for operation from the controller OpS 1 may be an event of an operation request from the controlled device IA3 user. Or, the trigger may be a connection event performed by the controller OpS operator with specified timing.

The controller (OpS) communication unit 43 establishes connection to the translator HGW 2 (602) and sends a registered information acquisition request to the Lookup service 31 (603). Receiving the registered information acquisition request (603), the Lookup service 31 selects an aggregate of information matched with requirements from the controller OpS 1 from among information registered in the Lookup service 31 itself and sends the aggregate. In this case, the controller OpS 1 belongs to the first network. Therefore, the Lookup service 31 passes all the registered information, that is, the controlled device information proxies 35, containing identification information for the first network to the controller OpS 1 (604).

Based on the acquired aggregate of information of the controlled device (IA) information proxies 35, the controller OpS communication unit 43 generates and displays a screen for operating the controlled device IA (605). Once the above-mentioned processing has been completed, operation methods for all the controlled devices IA which belong to the second network and are registered in the Lookup service 31 can be displayed on the screen of the controller OpS 1.

Next, the operator selects an operation method the operator desires to execute from among the controlled device (IA) operation methods shown through the GUI 44. A method execution request is issued to the controller (OpS) communication unit 43 (610). The controller (OpS) communication unit 43 issues a controlled device (IA) operation method relaying instruction with respect to the controlled device (IA) information proxies 35. The controlled device (IA) information proxies 35 have been provided with the identification information (global address) of the translator HGW 2 for the first network. Therefore, the controller OpS communication unit 43 can issue an operation method relaying instruction for the controlled device IA3 to the translator HGW 2 at the address thereof.

Further, the controlled device (IA) operation method relaying instruction contains the private address of the controlled device IA3 and information for specifying an operation method to be executed. Based on the controlled device IA3 and the operation method information specified by the controlled device IA operation method relaying instruction, the proxy function unit 32 executes the operation method for the controlled device IA3 (611).

The controlled device information management unit 23 executes the operation method. If necessary, the controlled device information management unit 23 works with the controlled device (IA) firmware 22 to control the controlled device IA3 itself. Further, the controlled device information management unit 23 acquires information about the result of execution of the operation method from the controlled device (IA) firmware 22 (612). Then, the controlled device information management unit 23 returns the information to the controller OpS communication unit 43 through the proxy function unit 32 (613). Receiving the result of execution of the method, the controller OpS communication unit 43 incorporates the result of execution in the GUI 44. The controller OpS communication unit 43 thereby notifies the controller OpS operator of the result of control of the controlled device IA (614).

Performing the above-mentioned processing, the operator can easily control any controlled device IA registered in the Lookup service 31. This is also the case even if the controller OpS 1 and the controlled device IA3 belong to different networks. In this embodiment, the controlled device information proxies 35 themselves contain corresponding controlled device information 36 and operation method information. Therefore, translator HGW 2 need not manage the correspondence between the controlled device information proxies 35 and the controlled device information 36.

Since a versatile relaying function may be used, all the commands need not be interpreted. Even if any operation method held by a controlled device IA3 is modified, a new operation method can be relayed without any modification at the translator HGW 2.

In this example, controlled device (IA) information held by the controlled device IA3 is all registered in the Lookup service 31. Alternatively, the controlled devices IA3 may be provided with a function of gathering all the operation methods contained in controlled device (IA) information. Thus, only controlled device information for all operation method gathering function has to be registered in the Lookup service 31. As a result, the controller OpS 1 can acquire all the controlled device information held by the controlled device IA3 by performing the all operation method gathering function (606 to 609). In this case, the Lookup service 31 only has to hold only one piece of controlled device (IA) information 36 for one controlled device (IA). In addition, the necessity is obviated for re-registering controlled device information each time a function of a controlled device IA3 is modified.

Next, control information held by controlled devices IA (controlled device information) will be described. The controlled device (IA) information is an object described in an object-oriented language, such as Java. An object contains information about the status and behavior of a function altogether, and the entity of an object is generated from a model called class. More specifically, for example, the functions a refrigerator has are defined by a refrigerator class, and a refrigerator object having the functions of the refrigerator can be created by subjecting the refrigerator class to specified processing (e.g. compile).

Figure 7:
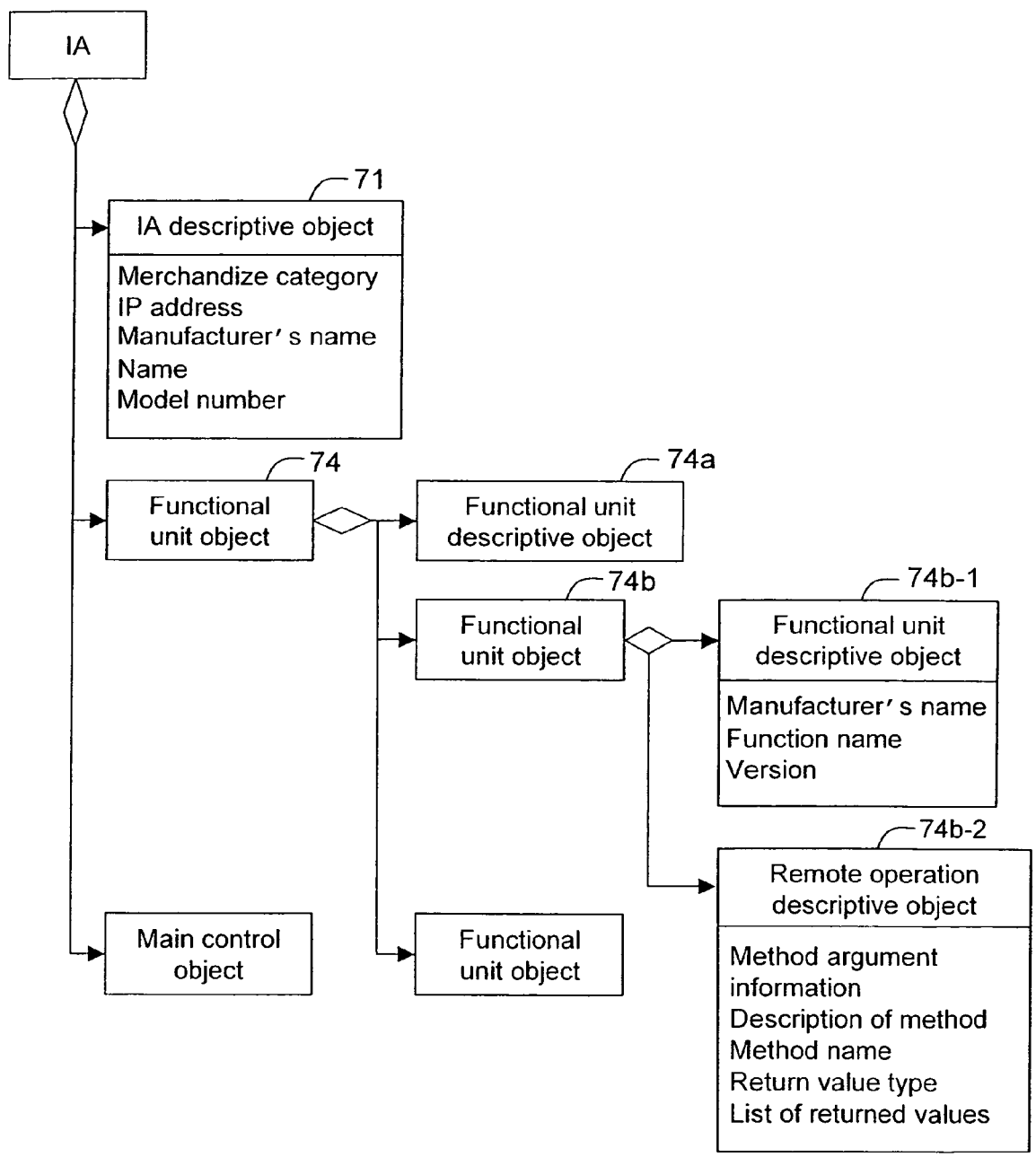
FIG. 7 is a drawing illustrating an example of the constitution of a controlled device IA object in the control system in the embodiment of the present invention.

FIG. 7 illustrates the basic structure of controlled device information objects and an example of information contained in each object. A controlled device IA3 has one controlled device IA descriptive object 71 containing information representing the controlled device IA3 itself, and functional unit objects 74 representing the functions of the controlled device IA3 by objects. The functional unit objects 74 are objectified function by function provided by the controlled device IAS3. In case of a refrigerator, for example, the functional unit objects thereof include a cold room object, a freezing compartment object, and the like.

The controlled device IA3 has one controlled device IA descriptive object 71 and one or more functional unit objects 74. The controlled device (IA) descriptive object 71 contains individual information, including, for example, the merchandize category, manufacturer's name, and model number, of the controlled device IA3. When controlling the controlled device IA3, the controller OpS 1 can know, for example, the formal controlled device information thereof by referencing the controlled device IA descriptive object 71.

The functional unit object 74 is also represented as a set of a functional unit descriptive object 74a and functional unit objects 74b and 74c. The functional unit descriptive object 74 contains operation method information required for remotely controlling a certain function. The functional unit object 74 includes functional unit descriptive objects 74a and 74b-1 containing information representing functional units; and remote operation descriptive object 74b-2 containing information required for using operation methods contained in a functional unit object 74b.

The functional unit object 74b contains a plurality of operation methods and has as many remote operation descriptive objects 74-2 as there are operation methods.

The functional unit descriptive object 74b-1 contains information, including manufacture's name and function names, indicating what function the unit concerned has. The remote operation descriptive object 74b-2 contains argument information, returned value information, and the like required for remotely executing the operation method.

For example, in a remote operation information object 74b-2 related to an operation method setRSetTemp, such information as "Method argument information: temperature (° C.), −1 to −7," "Description of method: set a cold room temperature," "Method name: setRSetTemP," "Return value type: void," and "List of returned values: NULL," is set.

The controller OpS 1 acquires and references these descriptive objects. Thereby, the controller OpS 1 can know the controlled device IA3 or functional units, operation methods, and the like, and appropriately control the controlled device IA3.

Figure 10:
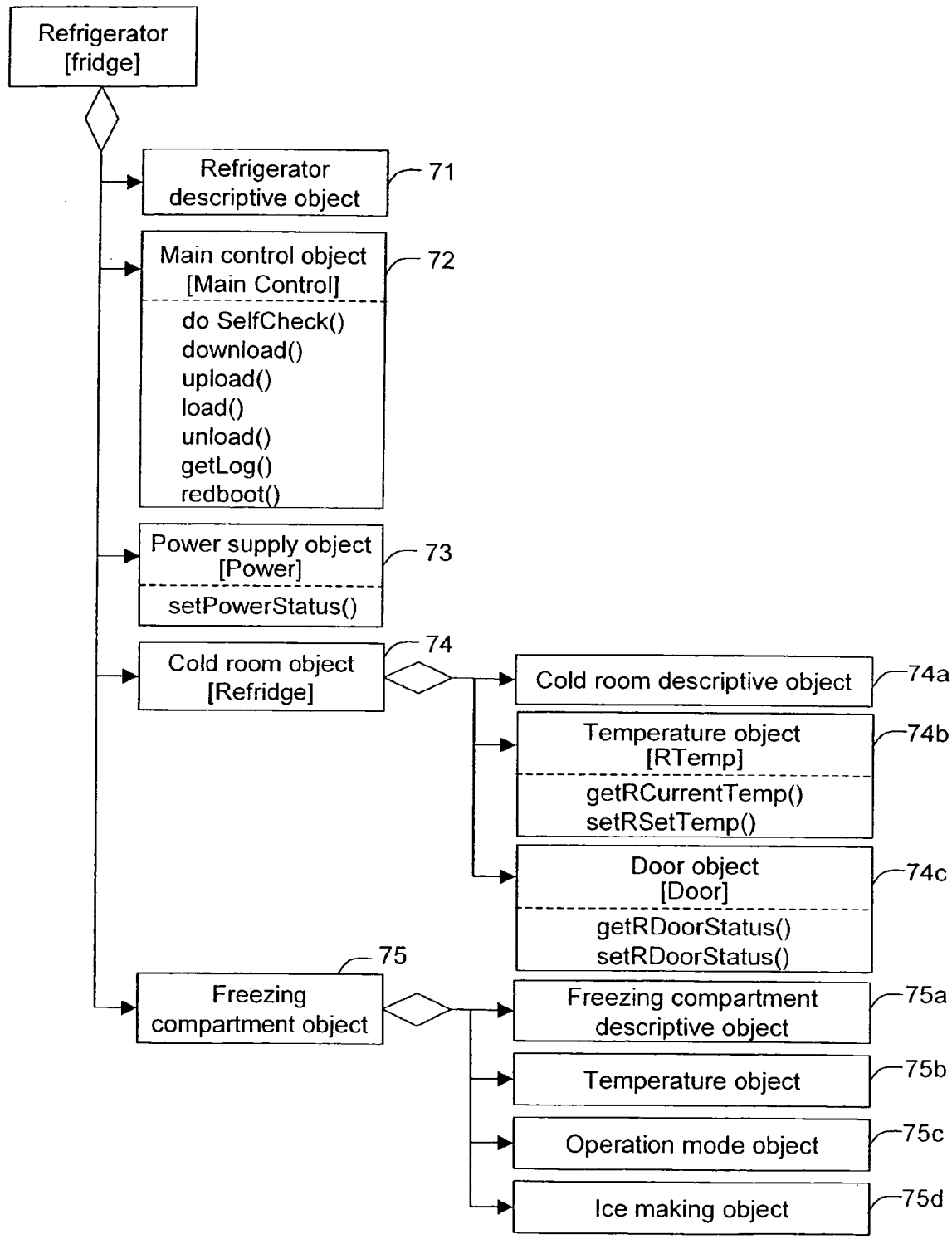
FIG. 10 illustrates an example of information contained in a controlled device IA object in the control system in the embodiment of the present invention, taking a refrigerator as an example.
Figure 11:
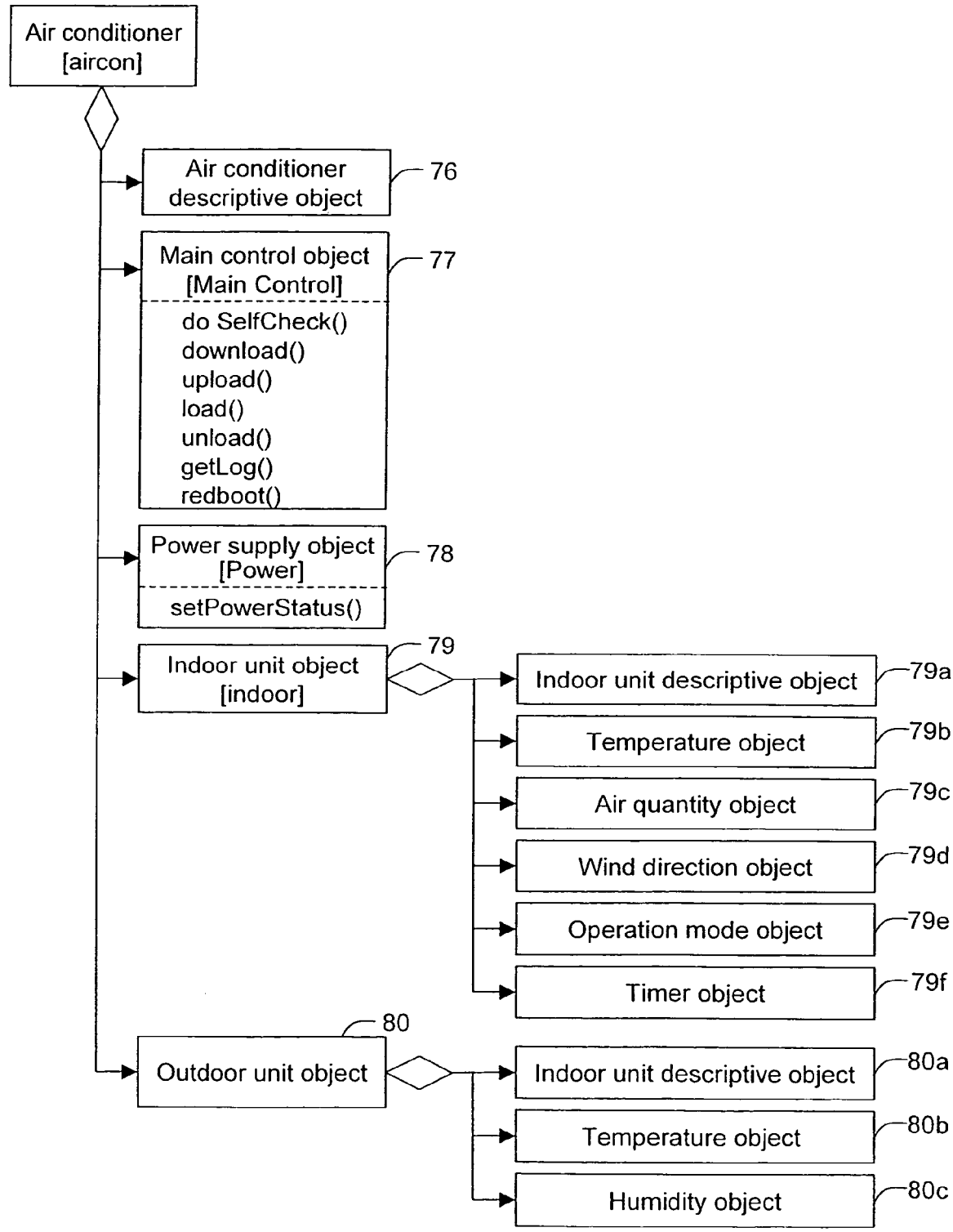
FIG. 11 illustrates another example of information contained in a controlled device IA object in the control system in the embodiment of the present invention, taking an air conditioner as an example.

FIGS. 10 and 11 illustrate examples wherein the structure of the controlled device information object, illustrated in FIG. 7, is applied to air conditioner and refrigerator, respectively.

Referring to FIG. 10, an example of the structure of a controlled device information object with respect to a refrigerator will be described. Objects related to the refrigerator includes a refrigerator descriptive object 71; and the basic functional objects of the refrigerator, such as power supply object 73, cold room object 74, and freezing compartment object 75. Also, a main control object 72 is included which is a common function which all the controlled devices IA basically have in common.

Each object contains operation methods which can be executed from remote terminals (controller OpS 1, translator HGW 2); information required for using the operation methods; and support information for using the operation methods.

For example, the power supply object 73 contains an operation method setPowerStatus for turning on and off the power supply. Further, the power supply object 73 may be provided with an operation method getPowerStatus for acquiring the status of power supply. The operation method for turning on and off the power supply is expressed as fridge.Power.setPowerStatus( ). [fridge.] indicates that the Power object is an object belonging to refrigerator, and [Power.] indicates that the operation method is related to the power supply object 73.

The cold room object 74 further includes a cold room descriptive object 74a, a temperature object 74b, and a door object 74c. The cold room descriptive object 74a contains descriptive information (e.g. manufacturer's name) related to the cold room. The temperature object 74b contains operation methods associated with temperature regulation in the cold room. The temperature object 74b contains, for example, getRCurrentTemp( ) for acquiring the present temperature in the cold room and setRsetTemp( ) for setting the cold room temperature.

The door object 74c contains operation methods related to the cold room door. The door object 74c contains getRDoorStatus( ) for acquiring the status of the door and setRDoorStatus( ) for setting the status of the door. The controller OpS 1 can remotely control the refrigerator by acquiring objects containing the above-mentioned operation methods and executing desired operation methods.

For example, if the user desires to set the cold room temperature to −1° C., the user only has to execute fridge.Refrig.RTemp.setRSetTemp(−1) at the controller OpS 1. To acquire the present status as the result of this control, fridge.Refrige.RTemp.getRCurrentTemp( ) is executed from the controller OpS 1. Thus, the present temperature in the cold room can be acquired.

As illustrated in FIG. 11, the objects with respect to an air conditioner include an air conditioner descriptive object 76; a main control object 77 as the basic function of the air conditioner; a power supply object 78; an indoor unit object 79; and an outdoor unit object 80. The indoor unit object 79 and the outdoor unit object 80 further include functional unit objects (80b to 80f, 81b to 81c). There are a functional unit descriptive object and a remote operation descriptive object for each functional unit.

In the example illustrated in FIG. 11, the configuration of objects is matched with the configuration of components of the actual product. Therefore, if any component is actually replaced, updating of information necessitated by this component replacement is simply completed. What has to be done is only to rewrite relevant functional objects and descriptive objects and remote operation information objects included in the functional objects. Thus, operation of replacing components or functions is simplified and the necessity is obviated for separately managing how to use operation methods and the like.

Further, support information for operation methods can be contained in remote operation information objects. Thus, when someone makes repairs from the controller OpS 1, for example, he/she can know on what occasion an operation method concerned should be utilized, by referring to corresponding support information.

Further, as an example, it is assumed that an operation method is to be used in repairing work. In this case, know-how to conduct repairing work, such as information about what operation method should be used against what phenomenon, can be contained as support information in remote operation information objects. Thus, it becomes unnecessary for the operator of the controller OpS 1 to refer to a separate database, such as a repair manual. Further, up-to-date know-how to conduct repairing work can be always held in controlled devices IA by updating remote operation information objects as required.

The constitution of a new controlled device IA can be defined by recomposing appropriate objects. For example, a combo TV-VCR having both the functions of a television and the functions of a videocassette recorder can be constituted by combining objects with respect to the television with objects with respect to the videocassette recorder. In this case, operation methods are the same as for conventional televisions and videocassette recorders. Therefore, the same applies to the method for control from the controller OpS 1, and the operator can control controlled devices IA with ease.

In the embodiment mentioned above, the constitution of objects containing remotely controllable operation methods is described. However, a controlled device IA itself may be constituted of objects on a function-by-function basis, regardless of whether remote control can be performed.

Next, downloading and uploading functions in the controlled device IA in this embodiment will be described. The controlled device IA3 has in the main control object 72 operation methods for downloading and uploading arbitrary information.

For example, some of the functions of the controlled device IA3 are modified, related objects and the like are sent from the controller OpS 1 to the controlled device IA3 through the public network 7. For this purpose, the controller OpS 1 acquires the controlled device information proxy of the main control object 72. Then, the controller OpS 1 executes a download operation method to send required objects and files to the controlled device IA3.

Figure 18:
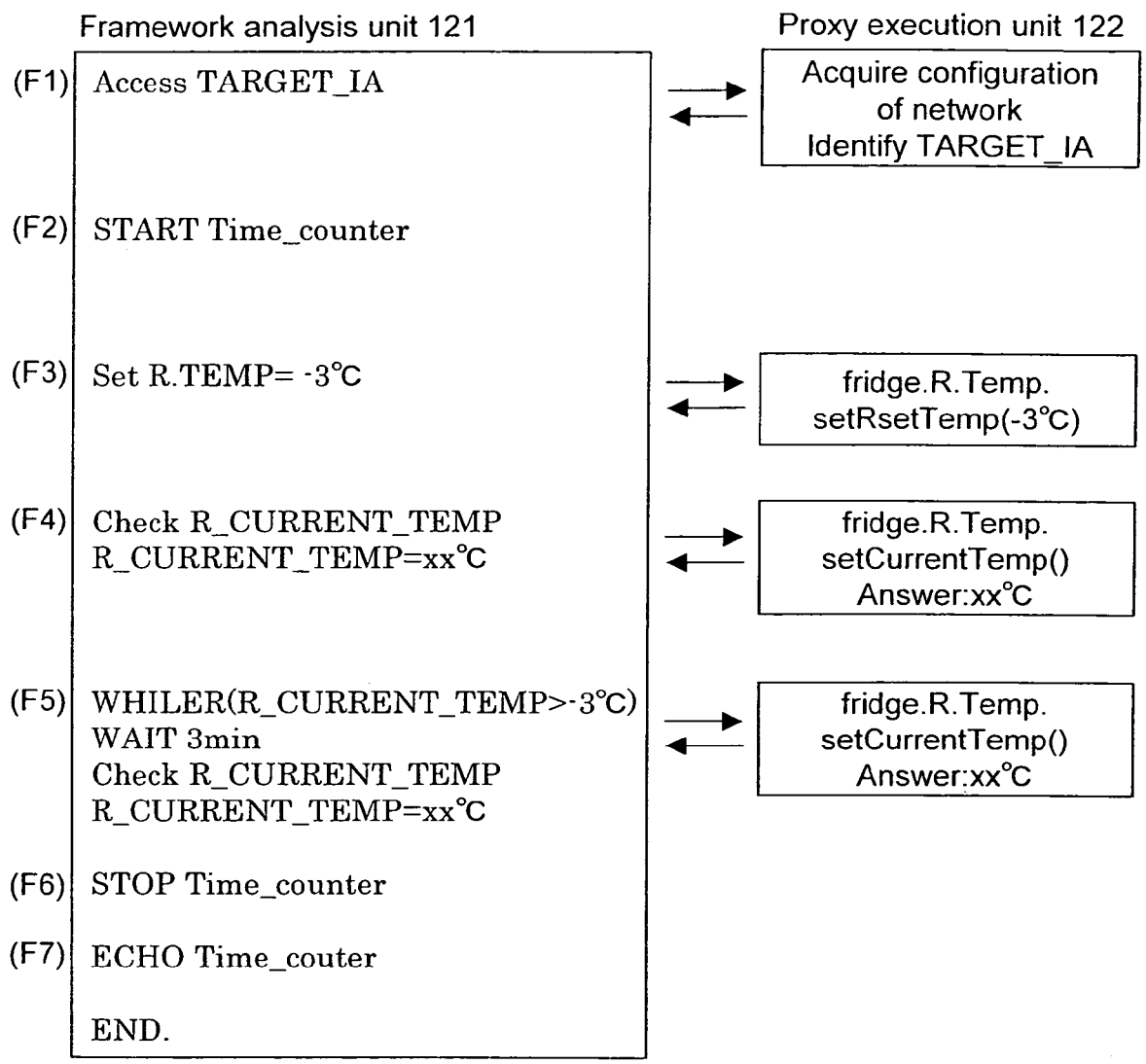
FIG. 18 is a drawing illustrating a sequence in which an object is downloaded from the controller OpS to a controlled device IA in the control system in the embodiment of the present invention.
Figure 19:
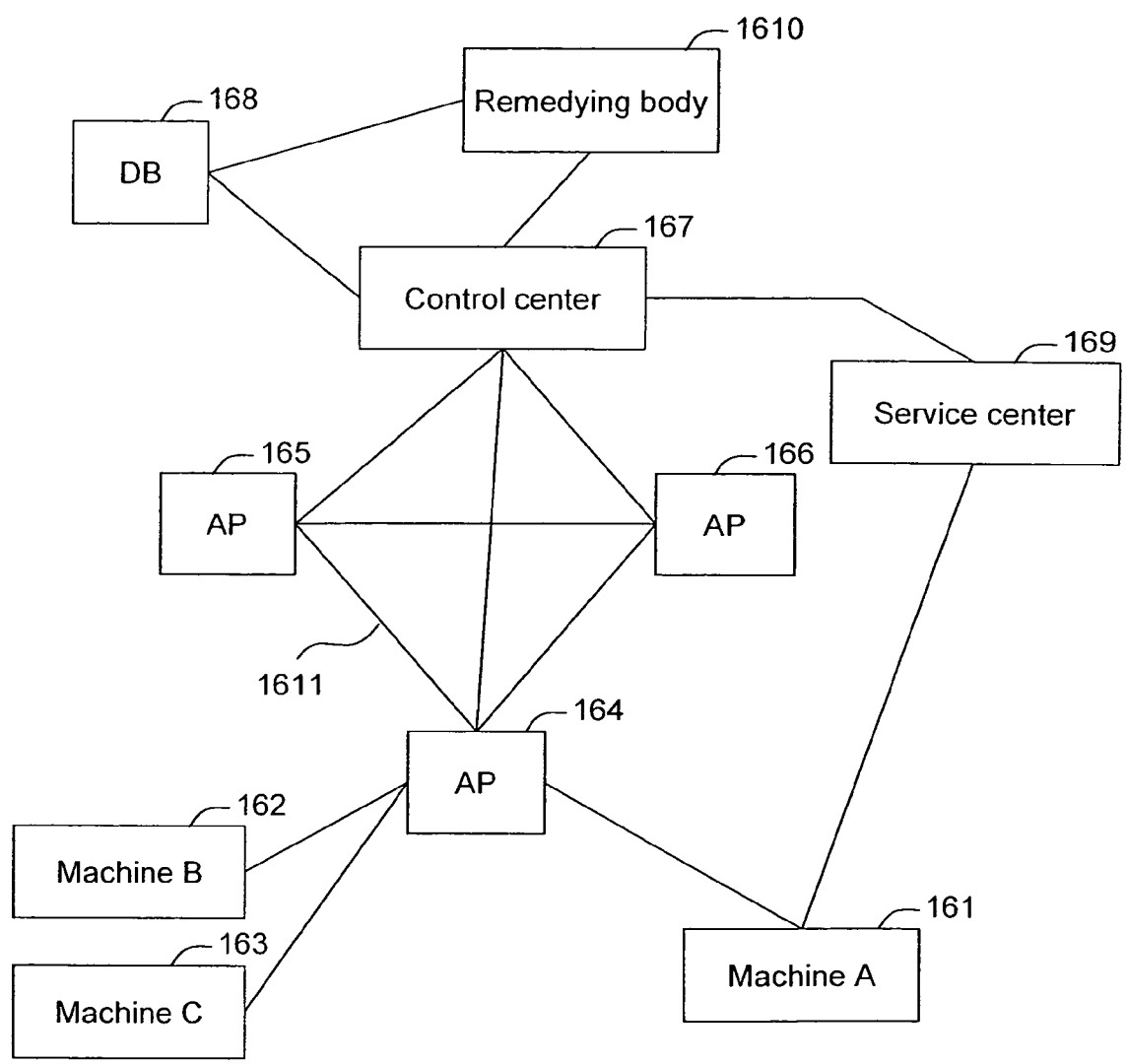
FIG. 19 is a drawing illustrating the configuration of a control system with a prior art.

FIG. 18 illustrates a sequence in which an object as illustrated in FIG. 7 is downloaded from the controller OpS 1 to the controlled device IA3. Here, it is assumed that operation methods executed at the controller OpS 1 are those contained in controlled device (IA) information proxies acquired in accordance with the sequence illustrated in FIG. 18. At process step 151, controlled device ia.MainControl.unload( ) is executed from the controller OpS 1 to unload an object specified at the controlled device IA3 (T5). Then, controlled device ia.MainControl.download( ) is executed from the controller OpS 1 (152) to transmit a new object. The controlled device IA3 expands the received object (T6), and waits until controlled device ia.MainControl.load( ) is executed from the controller OpS 1 (153). Then, the controlled device IA3 loads the new object (T7). This completes the replacement of objects.

In the above example, the procedure for replacing controlled device IA objects is described. The same mechanism can be used, for example, to replace firmware and update setting files. The mechanism can be used in uploading from the controlled device IA3 to controller OpS 1 to back up the files of controlled devices IA3.

Like the above-mentioned example, uploading from the controlled device IA3 to the controller OpS 1 is effected by containing an upload operation method in controlled device (IA) information.

Figure 12:
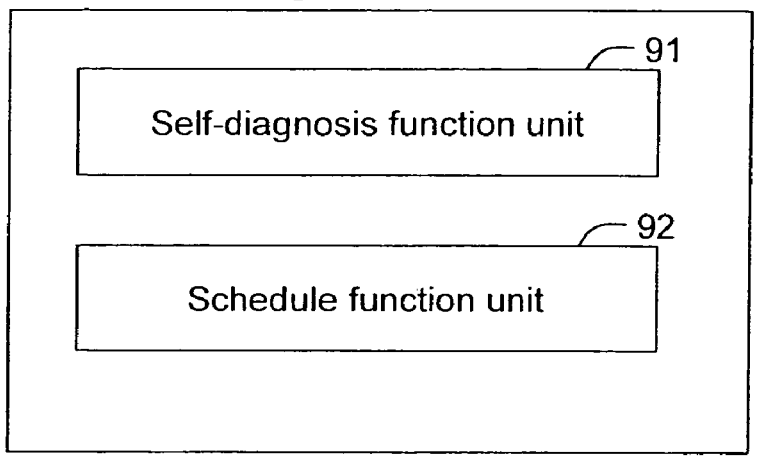
FIG. 12 is a drawing illustrating the constitution of a controlled device information management unit provided with a self-diagnosis function in the control system in the embodiment of the present invention.

FIG. 12 illustrates the constitution of the information management unit 23 of the controlled device IA3 illustrated in FIG. 2. In addition to the controlled device information managing function, the information management unit 23 has a self-diagnosis function unit 91 and a schedule function unit 92. The self-diagnosis function unit 91 performs operations related to a self-diagnosis function for checking the functions of the controlled device IA3, including the functions of the components and hardware thereof. The schedule function unit 92 is provided with a task scheduling management function, for example, a function of initiating a specified task at a preset time, and the like functions. On the schedule function unit 92, a time at which the self-diagnosis function is performed is set.

Figure 13:
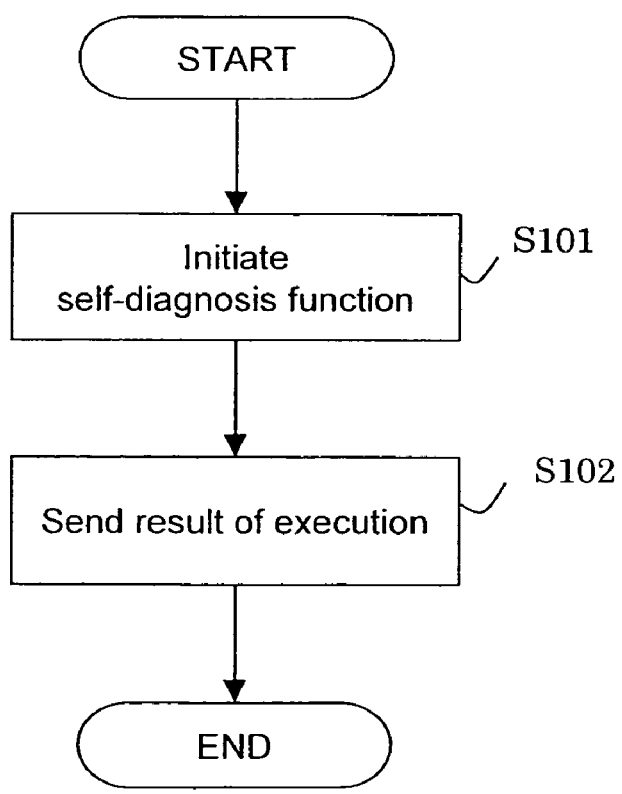
FIG. 13 is a flowchart illustrating processing performed in the self-diagnosis function in the control system in the embodiment of the present invention.

FIG. 13 illustrates the flow of the self-diagnosis carried out using the information management unit 23 of the controlled device IA3 illustrated in FIG. 12. When a scheduled time of self-diagnosis has come, the schedule function unit 92 informs the self-diagnosis function unit 91 of that, and self-diagnosis is initiated (Step S101). After the completion of the self-diagnosis, the result of the self-diagnosis is sent to the controller OpS 1 at Step S102. With this function, the occurrence of a failure in, and change in the status of, the controlled device IA3 can be grasped even if the controller OpS 1 does not monitor the device. Therefore, the rate of communication line occupation is reduced and communication lines can be effectively utilized.

Further, information about change in the status of the controlled device IA3 can be accumulated at the controller OpS 1. Thus, the occurrence of a failure can be predicted without monitoring and, if any failure occurs, the failure can be promptly remedied.

In this example, the result of execution of self-diagnosis is transmitted to the controller OpS 1. Alternatively, the controlled device IA3 may be provided with an execution result analysis function unit so as to compile required information according to the result of analysis and send it. Or, the system may be so designed that required information is compiled at the translator HGW 2. In this case, the result of self-diagnosis execution is transmitted from the controlled device IA3 to the translator HGW 2. Then, required information is compiled at the translator HGW 2 and sent to the controller OpS 1.

Figure 14:
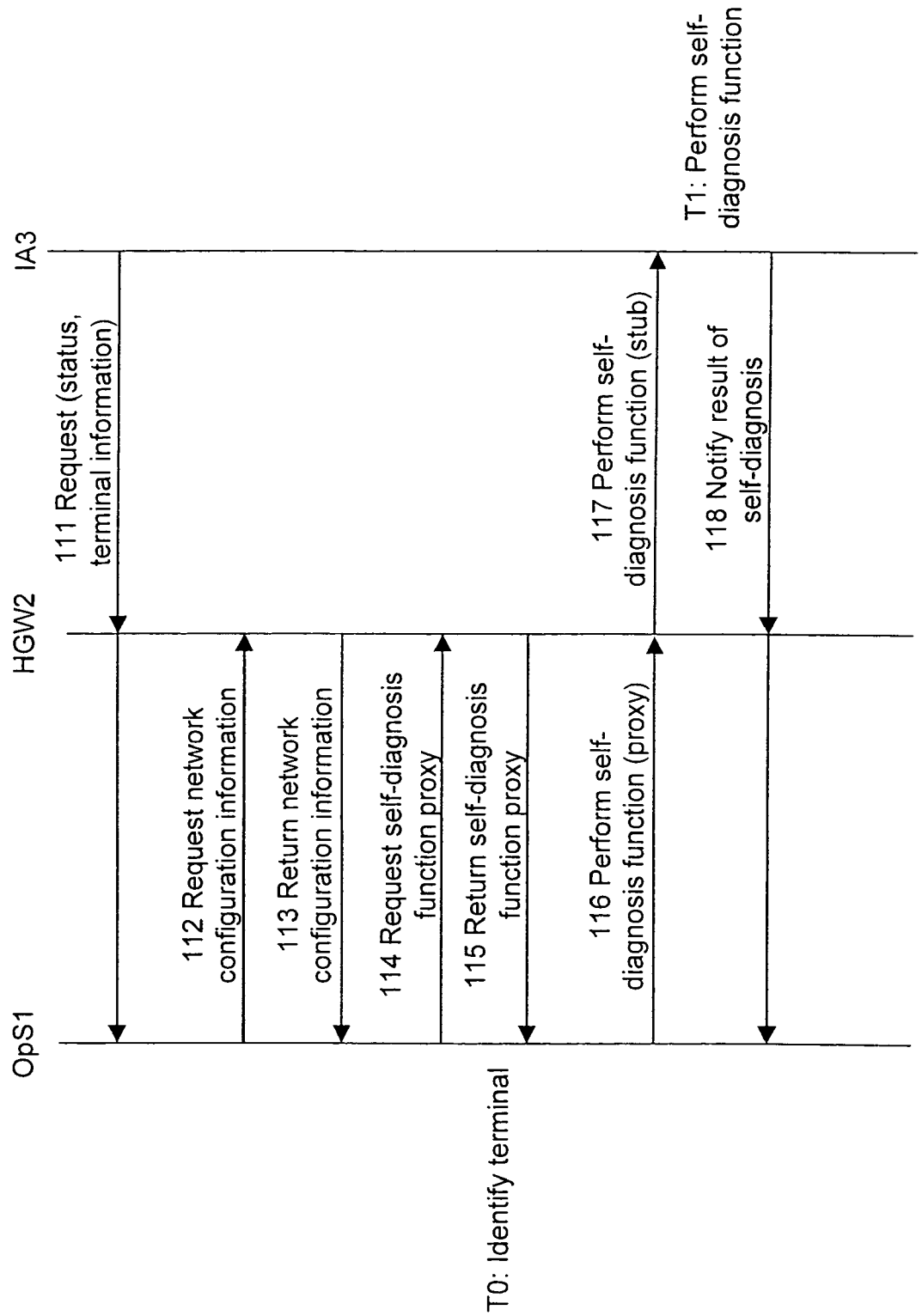
FIG. 14 is a drawing illustrating a sequence followed when a self-diagnosis request is made from a controlled device to the controller in the control system in the embodiment of the present invention.

FIG. 14 illustrates the sequence followed when a request to carry out self-diagnosis is forwarded from the controlled device IA3 to the controller OpS 1 and the controller OpS 1 causes the controlled device IA3 to carry out self-diagnosis.

As illustrated in FIG. 14, first, a request to carry out self-diagnosis is issued from the controlled device IA3 to the controller OpS 1 (111). This request contains terminal information required for identifying the controlled device IA3 (e.g. terminal ID, terminal name, MAC address). Receiving the request, the controller OpS 1 checks the translator HGW 2 in connection with the second network to which the requesting controlled device IA3 belongs. First, the controller OpS 1 accesses the translator HGW 2 and acquires information about the configuration of the second network (112, 113).

Then, according to the procedure illustrated in FIG. 8, the controller OpS 11 identifies the controlled device IA3 (T0). The controller OpS 1 acquires controlled device information proxies required for performing the self-diagnosis function of the target controlled device IA3 (114 and 115). Using the acquired controlled device (IA) information proxies, the self-diagnosis function of the target controlled device IA3 is performed from the controller OpS 1 (116, 117, T1). The result of self-diagnosis execution is sent from the target controlled device IA3 to the controller OPS 1 (118). In case of a software error, the controller OpS 1 corrects it according to the result.

This procedure makes it unnecessary for the controller OpS 1 to monitor the controlled device IA3. Communication between the controller OpS 1 and the controlled device IA3 only has to be conducted on specific occasions, such as the occurrence of a failure.

A self-diagnosis request from the controlled device IA3 to the controller OpS 1 may be forwarded over the networks illustrated in FIG. 1. Alternatively, different networks, for example, telephone networks, may be utilized for this communication. Or, another method may be used. In this method, the controlled device IA3 notifies an operator at a failure report reception desk, instead of the controller OpS 1, of a failure. Then, the operator uses the controller OpS 1 to control the controlled device IA3.

In the example, the self-diagnosis execution request from the controlled device IA3 to the controller OpS 1 contains terminal information. Alternatively, a request containing information on the present status, an operation log, a status log, and the like may be issued. Receiving the request, the controller OpS 1 takes action corresponding to these pieces of information. Thus, a more efficient failure recovery system can be implemented.

Next, referring FIG. 15 and FIG. 16, a framework will be described with an example taken. A framework is a series of work procedures described as a purpose-by-purpose combination of objects, which is processed in the controller OpS 1.

A case where a phenomenon that the temperature of the cold room of the refrigerator illustrated in FIG. 10 is not lowered is examined will be taken as an example. The framework and action in this case will be described. It is assumed that the operating state of a cooling compressor is judged by measuring the time it takes for the refrigerator temperature to lower to a preset temperature.

Figures 15, 16:
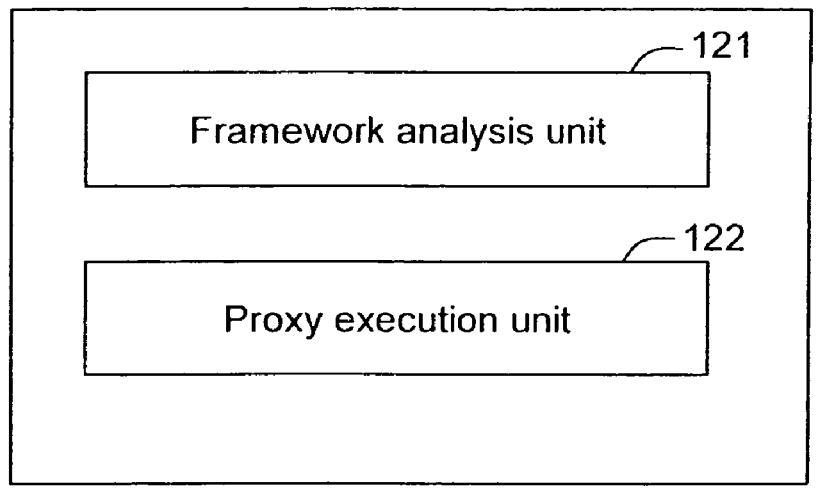
FIG. 15 is a drawing illustrating the constitution of a controller communication unit provided with a framework processing function in the control system in the embodiment of the present invention.
FIG. 16 is a drawing illustrating an example of a framework in the control system in the embodiment of the present invention.

As illustrated in FIG. 15, the controller OpS communication unit 43 includes a framework analysis unit 121 which analyzes which operation method of which controlled device information proxy should be used to execute frameworks; and a proxy execution unit 122 for actually executing the controlled device information proxies of operation methods. The proxy execution unit 122 is not shown in FIG. 6. However, every controller, even a controller OpS 1 having no framework processing function, is provided with a proxy execution unit without exception.

FIG. 16 illustrates an example of a framework for cold room cooling check. As illustrated in FIG. 16, frameworks are processed in the controller (OpS) communication unit 43 illustrated in FIG. 15. A framework is read by the controller OpS communication unit 43 and processed by the framework analysis unit 121 and the proxy execution unit 122.

Figure 17:
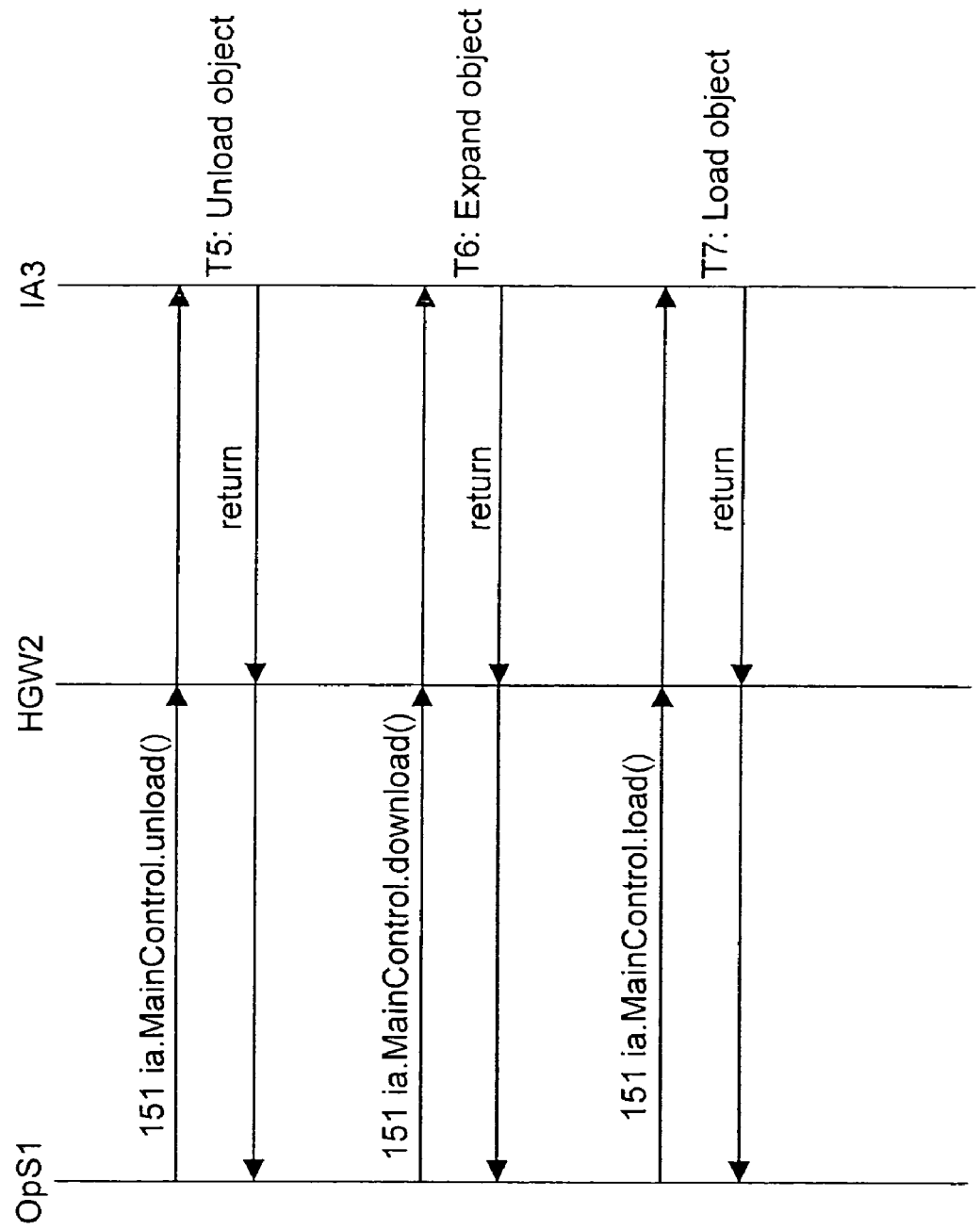
FIG. 17 is a drawing illustrating the sequence of framework processing in the controller communication unit in the control system in the embodiment of the present invention.

FIG. 17 illustrates the sequence of framework processing in the controller OpS communication unit 43. As mentioned above, a framework is analyzed at the framework analysis unit 121 and appropriate controlled device information proxies are executed by the proxy execution unit 122. Process steps taken among the controller OpS 1, the translator HGW 2, and the controlled device IA3, from access to the translator HGW 2 to the execution of controlled device information proxy, are the same as in the example described referring to FIG. 8. Therefore, the description of these process steps will be omitted.

Referring to FIG. 16 and FIG. 17, the sequence of processing will be described. Receiving a report of temperature rise in the cold room, the controller OpS 1 executes cold room temperature check framework. As illustrated in FIG. 16, first, the controller OpS 1 analyzes "Access TARGET_IA" (F1) through the framework analysis unit 121 and accesses the target refrigerator through the proxy execution unit 122. The controller OpS 1 acquires network configuration information and identifies the target refrigerator. "START Time_counter" (F2) is processing within the controller OpS 1 and processing through the proxy execution unit 122 is unnecessary. Consequently, the controller OpS 1 starts a counter for time measurement. Next, "SetR.TEMP=−3° C" (F3) is analyzed and an operation method fridge.R.Temp.setRsetTemp(−3° C.) for setting the cold room temperature to −3° C. is executed.

Thus, the method of the actual target refrigerator is executed at the translator HGW 2 in accordance with the procedure illustrated in FIG. 8. After the completion of this method, an operation method fridge.R_Temp.getCurrentTemp( ) for acquiring the present cold room temperature is executed by "Check R_CURRENT TEMP: R_CURRENT_TEMP=XX° C" (F4). The result of execution is inserted into R_CURRENT_TEMP. In F5, the present cold room temperature R_CURRENT_TEMP is compared with −3° C. set in F3. Where the present cold room temperature is matched with the preset temperature, the operation exits from the loop of processing and proceeds to F6. If the cold room temperature is not matched with the preset temperature, the operation waits for three minutes, for example. Then, fridge.R.Temp.getCurrentTemp( ) is executed again to check the present cold room temperature. When the cold room temperature is matched with the preset temperature, the counter for time measurement is stopped by "STOP Time_counter" (F6). The counter for time measurement is outputted by "ECHO_Time_counter" (F7), and the processing of the framework is completed.

The time it takes for the cold room temperature of the refrigerator to reach the preset temperature can be obtained by performing the above-mentioned processing. The operating state of the cooling compressor can be estimated from the obtained time. The operator who operates the controller OpS 1 only has to execute the framework. The operator can concurrently conduct other works until the result of a series of processing is outputted. Thus, the operation by operator is made more efficient.

The above-mentioned example is an example of a simple framework. Even in case of more complicated processing wherein a plurality of objects or controlled devices IA are involved, the processing is simply and accurately controlled by defining frameworks. Frameworks are described in a predetermined format. Frameworks may be provided by a manufacturer who manufactures controlled devices IA3 or may be defined by users. Or, based on accumulated repairing know-how, a repair center or the like that operates a controller OpS 1 may define frameworks. Thus, frameworks' dependence on individual controlled devices IA is prevented, and frameworks can be standardized among controlled devices IA.

Frameworks may be generated in a controller OpS 1 or may be acquired from an external storage medium, such as a floppy disk, supplied from a manufacturer. Or, they may be acquired from a framework database (not shown) through the public network 7.

The foregoing also applies to cases where the controlled device IA3 and the controller OpS 1 do not belong to different networks. Without the proxy function unit 32 in the translator HGW 2, the controlled device IA3 can be controlled from the controller OpS 1 as long as the controlled device IA3 has the same constitution of objects. As an example, it is assumed that the controller OpS 1 is not a stationary terminal but, for example, a portable terminal used by service personnel on customer's site. In this case, the controlled device IA3 can be controlled and the resources of the controller OpS 1, such as a database, can be used by temporarily connecting the portable terminal to the home LAN. Thus, the service personnel's efficiency of visiting repair work is enhanced.

As mentioned above, in the control system in this embodiment, a controlled device IA can be controlled from a controller OpS even if the controller OpS and the controlled device IA exist in different networks and the controlled device IA cannot be directly accessed from the controller OpS.

Further, when the controller OpS acquires information about the controlled device IA from the controlled device IA, the acquired controlled device (IA) information contains information associated with the operation of the controlled device IA. The operation screen of the controller OpS is generated based on the controlled device information acquired from the controlled device IA. Therefore, the controller OpS need not hold enormous amounts of control data or control information for controlling the controlled device IA. Further, when a new controlled device IA is registered, operation information is acquired from the newly registered controlled device IA. Therefore, the newly registered controlled device IA can be controlled from the controller OpS.

Further, information for controlling the controlled device IA can be acquired from the entries in the translator HGW 2. Therefore, even if maintenance operation is handed over to another controller OpS different in system, the controlled device IA can be controlled as long as the method call procedure is guaranteed. The controlled device IA can be controlled according to the procedure illustrated in FIG. 8 only by handing over information (e.g. address, right to gain access) required for connection to the translator HGW 2.

Further, the translator HGW is provided with a function of automatically generating controlled device information proxies. Therefore, time and manpower required to cope with addition of new functions or new controlled devices IA can be saved.

The controlled devices IA are constituted of objects. When the objects are grouped by the functions the objects have, the objects are classified into three types: objects common to all the controlled devices IA, common objects by merchandise category, and objects specific to products. For example, objects common to all the controlled devices IA can be incorporated in all the controlled devices IA. Thus, the controller OpS can always implement consistent operation regardless of the manufacturers of products to be controlled.

Further, the same objects can be incorporated in products of different manufacturers as long as the products fall under the same merchandize category. For example, televisions fall under the same merchandize category of "television." Therefore, the same operation can be performed on televisions even if they are produced by different manufacturers. Thus, control, which conventionally varies from product to product and from manufacturer to manufacturer, can be standardized. Standardized operation will reduce the burdens on operators and significantly reduce the amount of information, such as know-how in maintenance. Manufacturers will be able to incorporate common objects in different equipment and reduce man-hours in development as compared with conventional cases where development work is conducted on an equipment-by-equipment basis.

INDUSTRIAL APPLICABILITY

As mentioned above, the present invention is suitable for controlling from a controller a controlled device which belongs to a network different from that to which the controller belongs and cannot be otherwise directly accessed from the controller.

According to the present invention, a translator is provided with a function of automatically creating controlled device information proxies. Therefore, the present invention is suitable for saving time and manpower required to cope with addition of new functions or new controlled devices IA. Control which conventionally varies from product to product and from manufacturer to manufacturer can be standardized. Since operation is standardized, the burdens on operators can be reduced and the work of accumulating know-how for maintenance and other like works can be significantly reduced. Further, the present invention allows manufacturers to incorporate common objects in different equipment. Thus, the present invention is suitable for reducing man-hours in development as compared with conventional cases where development work is conducted on an equipment-by-equipment basis.

The invention claimed is:

1. A control system comprising:
a first network including a controller,
a second network including one or more controlled devices, and
a translator correlated with said first network and with said second network, wherein that said controlled device comprises a controlled device information management unit which manages controlled device information about the controlled devices and a controlled device information communication unit which sends said controlled device information with appropriate timing,
said translator comprises a controlled device information proxy creating means which creates controlled device information proxies based on said controlled device information acquired from said controlled devices, and an information managing means for registering and managing said controlled device information and said controlled device information proxies, and
said controller comprises a means for acquiring said controlled device information proxies from said translator and issuing operating instructions for operating said controlled devices.

2. The control system according to claim 1, wherein that
said controlled device information contains operating instructions executable in said second network, and said controlled device information proxy is information containing operating instructions executable in said first network.

3. The control system according to claim 2, wherein that
said controlled device is provided with a self-diagnosis function for diagnosing the state of the controlled device itself;
a scheduling function for managing information about time when said self-diagnosis function is performed; and
a function of sending the result of self-diagnosis carried out by said self-diagnosis function to said controller.

4. The control system according to claim 2, wherein that
said controlled device is provided with a self-diagnosis function for diagnosing the state of the controlled device itself, and
said controller or said translator sends instructions to perform said self-diagnosis function to said controlled device with arbitrary timing.

5. The control system according to claim 1, wherein that
said controlled device information includes operating instructions related to said controlled devices, information required for using the operating instructions, and support information for using said operating instructions
said controlled device information proxy corresponds to said controlled device information and contains operating instructions for operating said controlled devices through said controller; and
when an operating instruction for controlling said controlled device, contained in said controlled device information proxies, is sent from said controller, said translator translates the operating instruction contained in the controlled device information proxies into an operating instruction contained in said controlled device information corresponding thereto and sends the operating instruction to said controlled device.

6. The control system according to claim 5, wherein that
said controlled device is provided with a self-diagnosis function for diagnosing the state of the controlled device itself, and
said controller or said translator sends instructions to perform said self-diagnosis function to said controlled device with arbitrary timing.

7. The control system according to any of claims 1 to 5, wherein that
said controlled device is provided with a downloading and uploading function for downloading and uploading any information, and
said controlled device information contains instructions to perform said downloading and uploading function.

8. The control system according to claim 1, wherein that said controlled device is provided with a self-diagnosis function for diagnosing the state of the controlled device itself; a scheduling function for managing information about time when said self-diagnosis function is performed; and a function of sending the result of self-diagnosis carried out by said self-diagnosis function to said controller.

9. The control system according to claim 1, wherein that said controlled device is provided with a self-diagnosis function for diagnosing the state of the controlled device itself, and said controller or said translator sends instructions to perform said self-diagnosis function to said controlled device with arbitrary timing.

10. The control system according to claim 1, wherein that said controller is provided with:

a function of reading frameworks which are arbitrary combinations of operating procedures described according to predetermined rules, and a function of interpreting said frameworks and executing operating instructions corresponding to operating procedures described in the frameworks.

11. A controller for use in a control system including a first network including the controller, a second network including one or more controlled devices, and a translator correlated with said first network and with said second network, said controlled device comprising a controlled device information management unit which manages information about the controlled device and a controlled device information communication unit which timely sends controlled device information managed by the controlled device information management unit, said translator comprising a controlled device information proxy means which creates controlled device information proxies based on said controlled device information acquired from said controlled devices and an information managing means for registering and managing said controlled device information and said controlled device information proxies, and said controller comprising a means for acquiring said controlled device information proxies from said translator or said controlled device and issuing operating instructions for operating said controlled devices, the controller further comprising:

a controlled device operating means for operating said controlled devices;

a compiling means which information required for the operation of said controlled devices into such a format as the controlled device operating means can utilize the information, based on information acquired from said translator; and a means for issuing appropriate controlled device control instructions according to input from an operator.

12. A controlled device for use in a control system including a first network including a controller, a second network including one or more of the controlled devices, and a translator correlated with said first network and with said second network, the said controlled device comprising a controlled device information management unit which manages information about the controlled device and a controlled device information communication unit which timely sends controlled device information managed by the controlled device information management unit, said translator comprising a controlled device information proxy means which creates controlled device information proxies based on said controlled device information acquired from said controlled devices and an information managing means for registering and managing said controlled device information and said controlled device information proxies, and said controller comprising a means which acquires said controlled device information proxie from said translator or said controlled devices and issues operating instructions for operating said controlled devices, the controlled device further having objects containing at least any of:

operating instructions related to the controlled device, information required for using the operating instructions, and support information for using said operating instructions.

13. The controlled device according to claim 12, wherein that operating instructions and information contained in said objects are classified on a function-by-function basis.

* * * * *